(12) United States Patent
Lin

(10) Patent No.: US 10,715,707 B2
(45) Date of Patent: Jul. 14, 2020

(54) IMAGING DEVICE ABLE TO PERFORM AUTO FOCUS AND VIBRATION COMPENSATION

(71) Applicants: Sintai Optical (Shenzhen) Co., Ltd., ShenZhen, Guandong Province (CN); Asia Optical Co., Inc., Taichung (TW)

(72) Inventor: Guo-Quan Lin, ShenZhen (CN)

(73) Assignee: SINTAI OPTICAL (SHENZHEN) CO., LTD., Taichung (TW)

( * ) Notice: Subject to any disclaimer, the term of this patent is extended or adjusted under 35 U.S.C. 154(b) by 0 days.

(21) Appl. No.: 16/263,310

(22) Filed: Jan. 31, 2019

(65) Prior Publication Data

US 2020/0186686 A1 Jun. 11, 2020

(30) Foreign Application Priority Data

Dec. 5, 2018 (CN) .......................... 2018 1 1479713

(51) Int. Cl.
*H04N 5/225* (2006.01)
*G02B 7/02* (2006.01)
*G02B 27/09* (2006.01)

(52) U.S. Cl.
CPC ............. *H04N 5/2254* (2013.01); *G02B 7/02* (2013.01); *G02B 27/0955* (2013.01); *G02B 27/0972* (2013.01)

(58) Field of Classification Search
CPC ............. H04N 5/2254; H04N 5/23248; H04N 5/23264; H04N 5/2328; H04N 5/23283; H04N 5/23287; H04N 5/2251; H04N 5/2252; H04N 5/2257; H04N 5/2259; G02B 7/02; G02B 27/0955; G02B 27/0972

See application file for complete search history.

(56) References Cited

U.S. PATENT DOCUMENTS

| 8,699,141 | B2 | 4/2014 | Aschwanden et al. |
| 9,891,445 | B1* | 2/2018 | Miller ................. G02B 27/646 |
| 2003/0011904 | A1* | 1/2003 | Chiu ....................... G02B 7/02 359/823 |
| 2004/0109064 | A1* | 6/2004 | Otsuka ................. H04N 5/2254 348/207.1 |
| 2006/0209437 | A1* | 9/2006 | Miyamoto ............. G02B 7/021 359/824 |
| 2009/0122421 | A1 | 5/2009 | Sakamoto et al. |
| 2016/0112610 | A1* | 4/2016 | Imai ................... G02B 13/0065 348/340 |

(Continued)

FOREIGN PATENT DOCUMENTS

| CN | 207516622 U | 6/2018 |
| CN | 207924232 U | 9/2018 |
| TW | 201107811 A | 3/2011 |

*Primary Examiner* — Albert H Cutler
(74) *Attorney, Agent, or Firm* — McClure, Qualey & Rodack, LLP.

(57) ABSTRACT

An imaging device includes a base, a prism module, a lens module and an imaging module. The prism module is fixedly disposed in the base. The lens module includes a lens unit, a first carrier configured to fix the lens unit, and a second carrier configured to accommodate the first carrier, wherein the lens unit has an optical axis extending in a first direction, the second carrier is connected to the base through an axial elastomer extending in the first direction, and the prism module and the lens module are disposed in the base and sequentially arranged in the first direction.

19 Claims, 17 Drawing Sheets

(56) References Cited

U.S. PATENT DOCUMENTS

2017/0294476 A1\* 10/2017 Hu .................... H01L 27/14683
2019/0212632 A1\* 7/2019 Miller ...................... G03B 3/10
2020/0041811 A1\* 2/2020 Zhang .................. G02B 27/646

\* cited by examiner

101

IMAGING DEVICE ABLE TO PERFORM AUTO FOCUS AND VIBRATION COMPENSATION

BACKGROUND OF THE INVENTION

Field of the Invention

The invention relates to a lens device, and more particularly to an imaging device.

Description of the Related Art

Many portable electronic devices (e.g. cell phones) are provided with lens devices. FIG. 1 is a schematic diagram of a known lens device 100. FIG. 2 is a schematic diagram of a prism unit 1011 of the known lens device 100. As shown in FIGS. 1 and 2, the known lens device 100 generally includes a prism module 101, a lens module 102 and an imaging module 103. The prism module 101 is configured to reflect a light beam which is incident in a Z-direction and reflected to propagate in an X-direction. The lens module 102 is configured to receive the light beam from the prism module 101. The light beam exiting from the lens module 102 is directed to form an image on the imaging module 103.

The prism module 101 has a prism unit 1011 inside, which is rotatable about an axis extending in a Y-direction. The lens module has at least one lens inside, and the lens can be driven to move in the X-direction and Y-direction in order to compensate for vibrations which may cause blur images and other problems. Because the prism unit 1011 and the lens module 102 of the lens device 100 are respectively controlled to compensate for the vibrations, such a control and the corresponding adjustments are neither simple nor easy.

BRIEF SUMMARY OF THE INVENTION

To address the above-described problem, the invention provides an imaging device, the control of which is simpler and easier. The imaging device in accordance with an exemplary embodiment of the invention includes a base, a prism module, a lens module and an imaging module. The prism module is fixedly disposed in the base. The lens module includes a lens unit, a first carrier configured to fix the lens unit, and a second carrier configured to accommodate the first carrier, wherein the lens unit has an optical axis extending in a first direction, the second carrier is connected to the base through an axial elastomer extending in the first direction, and the prism module and the lens module are disposed in the base and sequentially arranged in the first direction.

In another exemplary embodiment, the second carrier includes two side walls opposite to each other, an end wall connected to end portions of the side walls, and a bottom plate connected between bottom portions of the side walls. The lens module further includes a planar elastomer configured to provide a restoring force for return of the first carrier and the second carrier when the first carrier and the second carrier are moved away from each other in the first direction. The planar elastomer is connected between the first carrier and the second carrier. The planar elastomer is in a plane defined by the first direction and a third direction. The third direction is perpendicular to the first direction.

In yet another exemplary embodiment, the first carrier and the second carrier are connected through an inter-carrier axial elastomer extending in the first direction. The second carrier includes two side walls opposite to each other, an end wall connected to end portions of the side walls, and a bottom plate connected between bottom portions of the side walls. A plurality of connecting elements are disposed on the end wall and end surfaces of the side walls. The inter-carrier axial elastomer includes a first end fixed to the end wall of the second carrier, and a second end fixed to one of the connecting elements disposed on the end surfaces of the side walls of the second carrier. The inter-carrier axial elastomer extending in the first direction is penetrated through the first carrier.

In another exemplary embodiment, the base includes two lateral walls extending in a second direction, a base wall connected to the lateral walls, and two lateral plates connected to the lateral walls and disposed opposite to each other. The base wall is perpendicular to the lateral walls. The first direction is perpendicular to the second direction.

In yet another exemplary embodiment, the imaging device further includes a first directional driving element, a second directional driving element and a third directional driving element. The first directional driving element is disposed between the first carrier and the second carrier, and configured to drive the first carrier to move with respect to the second carrier in the first direction. The second directional driving element is disposed between the side walls of the second carrier and the lateral plates of the base, and configured to drive the second carrier to move with respect to the base in the second direction. The third directional driving element is disposed between top portions of the side walls of the second carrier and the lateral plates of the base, and configured to drive the second carrier to move with respect to the base in the third direction. The third direction is perpendicular to the first direction and the second direction.

In another exemplary embodiment, the imaging device further includes a first directional driving element, a second directional driving element and a third directional driving element. The base includes two lateral walls extending in a second direction, a base wall connected to the lateral walls, and two lateral plates connected to the lateral walls and disposed opposite to each other. The base wall is perpendicular to the lateral walls. The first directional driving element is disposed between the first carrier and the second carrier, and configured to drive the first carrier to move with respect to the second carrier in the first direction. The second directional driving element is disposed between the side walls of the second carrier and the lateral plates of the base, and configured to drive the second carrier to move with respect to the base in the second direction. The first direction is perpendicular to the second direction. The third directional driving element is disposed between top portions of the side walls of the second carrier and the lateral plates of the base, and configured to drive the second carrier to move with respect to the base in a third direction. The third direction is perpendicular to the first direction and the second direction. One of the connecting elements includes a first part, a second part extending from the first part to the inter-carrier axial elastomer, and a third part extending from the first part to the axial elastomer. The second part and the third part are curved. The second part is in a plane perpendicular to the first direction and extends towards the first carrier. The third part is in another plane perpendicular to the first direction and extends towards the base.

In yet another exemplary embodiment, a connecting element is disposed on an end portion of a side wall of the second carrier, the end portion of the side wall of the second carrier is adjacent to the prism module, and the axial elastomer has an end fixed to one of the lateral walls of the base and adjacent to the imaging module, and another end fixed to the connecting element.

In another exemplary embodiment, the imaging device further includes a first directional driving element, a second directional driving element and a third directional driving element. The second carrier includes two side walls opposite to each other, an end wall connected to end portions of the side walls, and a bottom plate connected between bottom portions of the side walls. The base includes two lateral walls extending in a second direction, a base wall connected to the lateral walls, and two lateral plates connected to the lateral walls and disposed opposite to each other. The base wall is perpendicular to the lateral walls. The first directional driving element is disposed between the first carrier and the second carrier, and configured to drive the first carrier to move with respect to the second carrier in the first direction. The second directional driving element is disposed between the side walls of the second carrier and the lateral plates of the base, and configured to drive the second carrier to move with respect to the base in the second direction. The first direction is perpendicular to the second direction. The third directional driving element is disposed between top portions of the side walls of the second carrier and the lateral plates of the base, and configured to drive the second carrier to move with respect to the base in a third direction. The third direction is perpendicular to the first direction and the second direction. A first guide groove and a second guide groove extend in the first direction and are respectively formed on an outer surface of the first carrier and an inner surface of the second carrier. A ball is disposed in the first guide groove and second guide groove.

In yet another exemplary embodiment, the ball has a part disposed in the first guide groove and another part disposed in the second guide groove, the first carrier and the second carrier are connected through the ball, thereby allowing the first carrier to move with respect to the second carrier.

In another exemplary embodiment, the planar elastomer includes a first carrier connecting portion, a second carrier connecting portion, and a meandering portion connected between the first carrier connecting portion and the second carrier connecting portion, and the meandering portion meanders to extend in the first direction and the third direction.

In yet another exemplary embodiment, the second carrier connecting portion of the planar elastomer includes a first part connected to the second carrier, and a second part extending from the first part and beyond the second carrier; the second part is in another plane perpendicular to the first direction; and the axial elastomer has an end connected to the base, and another end connected to the second part.

In another exemplary embodiment, the first carrier includes two peripheral walls and an end wall connected to end portions of the peripheral walls, each peripheral wall is substantially U-shaped in section and has an opening; the end wall of the first carrier is close to the imaging module and is perpendicular to the first direction.

In yet another exemplary embodiment, the first carrier has first planar-elastomer connecting portions oppositely formed on the top surfaces of the peripheral walls; the second carrier has second planar-elastomer connecting portions oppositely disposed on top surfaces of the side walls.

In another exemplary embodiment, the planar elastomer includes a first carrier connecting portion, a second carrier connecting portion, and a meandering portion connected between the first carrier connecting portion and the second carrier connecting portion, the first carrier connecting portion are connected to the first planar-elastomer connecting portions of the first carrier, the second carrier connecting portion are connected to the second planar-elastomer connecting portions of the second carrier.

In yet another exemplary embodiment, the inter-carrier axial elastomer provide the first carrier with a restoring force arising from deformation of the inter-carrier axial elastomer when the first carrier is moved with respect to the second carrier.

In another exemplary embodiment, the first carrier includes two peripheral walls and an end wall connected to end portions of the peripheral walls, each peripheral wall is substantially U-shaped in section and has an opening; the end wall of the first carrier is close to the imaging module and is perpendicular to the first direction.

In yet another exemplary embodiment, the second carrier includes two side walls opposite to each other, and an end wall connected to end portions of the side walls; the lens module further includes a planar elastomer configured to provide a restoring force for return of the first carrier and the second carrier when the first carrier and the second carrier are moved away from each other in the first direction; the planar elastomer is connected between tops of the first and second carriers; the planar elastomer is parallel to a plane defined by the first direction and a third direction; and the third direction is perpendicular to the first direction.

In another exemplary embodiment, the planar elastomer includes a first carrier connecting portion, a second carrier connecting portion, and a meandering portion connected between the first carrier connecting portion and the second carrier connecting portion, and the meandering portion meanders to extend in the first direction and the third direction.

In yet another exemplary embodiment, the second carrier connecting portion of the planar elastomer includes a first part connected to the second carrier, and a second part extending from the first part and beyond the second carrier; the second part is in another plane perpendicular to the first direction; and the axial elastomer has an end connected to the base, and another end connected to the second part.

In another exemplary embodiment, the second carrier further includes a connecting portion connected between the side walls.

In yet another exemplary embodiment, the connecting portion includes a horizontal section and two inclined sections, and the inclined sections are slanted to extend from the side walls to the horizontal section; and the connecting portion is connected to either top portions of the side walls or bottom portions of the side walls.

In another exemplary embodiment, the second carrier further includes two connecting portions connected to top portions and bottom portions of the side walls; and each of the connecting portions includes a horizontal section and two inclined sections, and the inclined sections are slanted to extend from the side walls to the horizontal section.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following embodiments and the accompanying drawings are made for easily understanding the purpose, technical solutions and advantages of the invention and should not be taken in a limiting sense.

Figure 1:
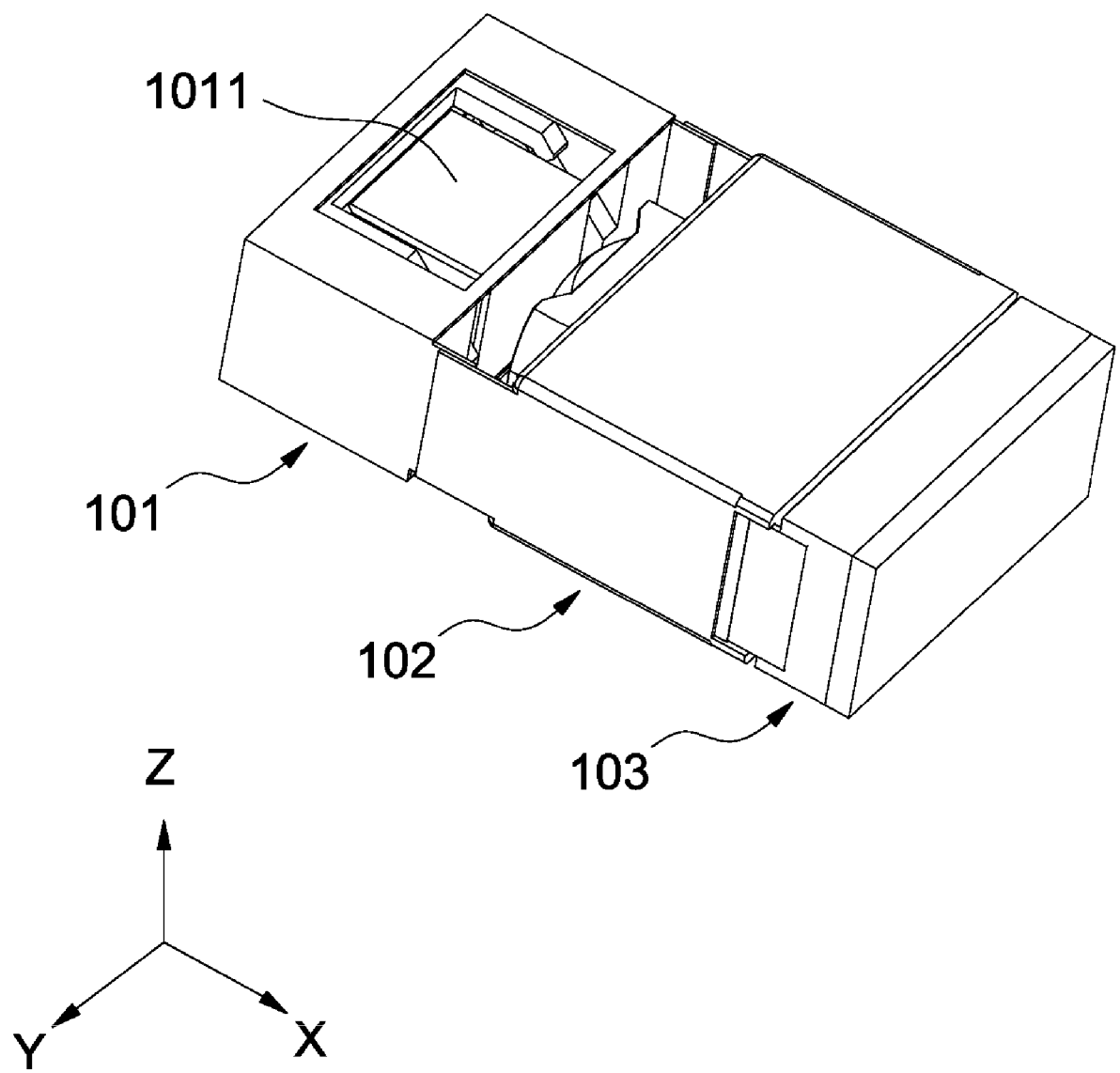
FIG. 1 is a schematic diagram of a known lens device.
Figure 2:
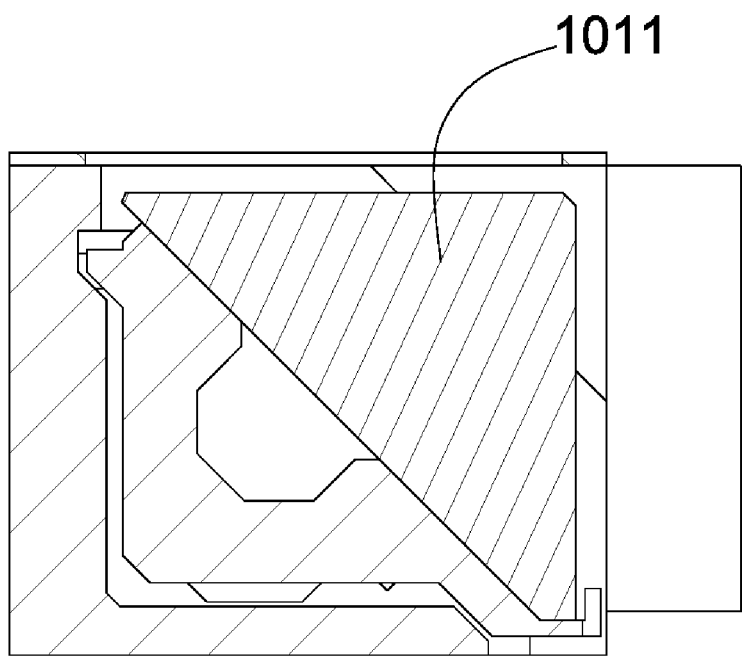
FIG. 2 is a schematic diagram of a prism unit of the known lens device.
Figure 3:
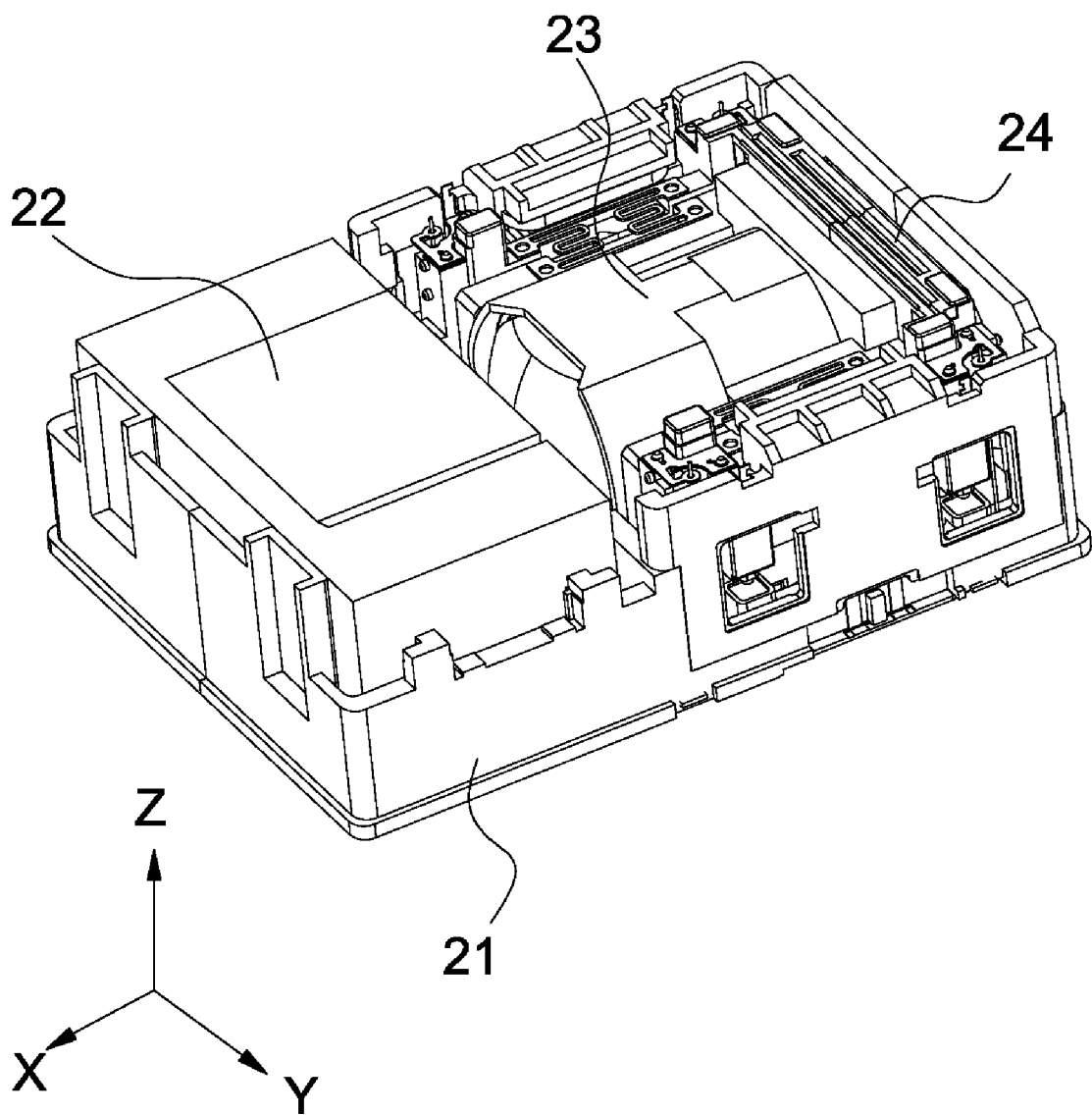
FIG. 3 is a schematic diagram of a lens device in accordance with a first embodiment of the invention.
Figure 4:
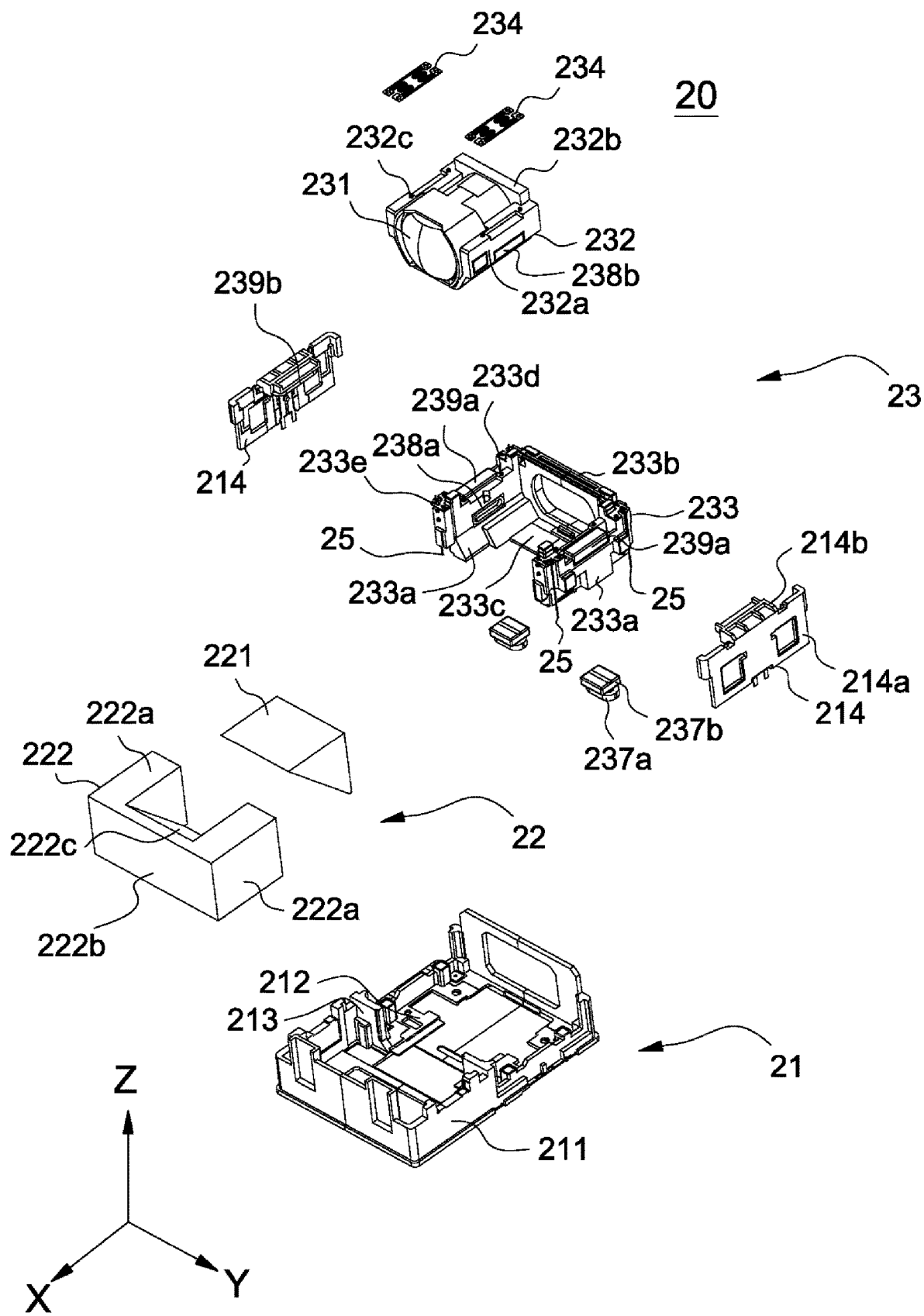
FIG. 4 is an exploded diagram of the lens device in accordance with the first embodiment of the invention.

Referring to FIGS. 3 and 4, FIG. 3 is a schematic diagram of a lens device 20 in accordance with a first embodiment of the invention and FIG. 4 is an exploded diagram of the lens device 20 in accordance with the first embodiment of the invention. In the first embodiment, the lens device includes a base 21, a prism module 22, a lens module 23 and an imaging module 24, wherein the prism module 22, the lens module 23 and the imaging module 24 are disposed in the base 21 and are sequentially arranged in a first direction X. The prism module 22 is configured to reflect a light beam which is incident in a second direction Z and reflected to propagate in a first direction X wherein the first direction X is perpendicular to the second direction Z. The lens module 23 is configured to receive the light beam from the prism module 22. The light beam exiting from the lens module 23 is directed to form an image on the imaging module 24.

The base 21 is substantially a frame and includes lateral walls 211 extending in the second direction Z, and a base wall 212 connecting to the lateral walls 211. The base wall 212 is perpendicular to the lateral walls 211. The base 21 further includes partitions 213 extending from the lateral walls 211 in a third direction Y to divide the interior of the base 21 into two parts: one is used for accommodating the prism module 22 and the other is used for accommodating the lens module 23 and the imaging module 24. It is noted that the third direction Y is perpendicular to the first direction X and the second direction Z. Two lateral plates 214 are disposed at opposite sides of the lens module 23 and fixed to the lateral walls 211. It is understood that the lateral plates 214 may be integrally formed with the lateral walls 211 to form continuous-unity structure.

The prism module 22 includes a prism unit 221 and a prism unit carrier 222. The prism unit has two side walls 222a and a rear wall 222b connected between the side walls 222a. The rear wall 222b has an inclined surface 222c for supporting the prism unit 221. The prism unit 221 may be fixed to the prism unit carrier 222 by gluing. The prism module 22 may be fixed to the base 21 by engaging, gluing or other means. The invention is not limited to the described structure and connecting ways. For example, the prism unit carrier 222 can be omitted and the prism unit 221 is directly fixed to the base 21.

The lens module 23 includes a lens unit 231, a first carrier 232 for fixing the lens unit 231, and a second carrier 233 for accommodating the first carrier 232. The lens unit 231 has an optical axis extending in the first direction X, at least one lens, and a lens barrel for accommodating the at least one lens. The first carrier 232 includes two peripheral walls 232a and an end wall 232b connected to end portions of the peripheral walls 232a. Each peripheral wall 232a is substantially U-shaped in section and has an opening. The end wall 232b is close to the imaging module 24 and is perpendicular to the first direction X. The first carrier 232 has first planar-elastomer connecting portions 232c oppositely formed on the top surfaces of the peripheral walls 232a. The first planar-elastomer connecting portions 232c may be, for example, protrusions.

The first carrier 232 is movable with respect to the second carrier 233 in a direction which has an X-directional component, a Y-directional component and/or a Z-directional component. The second carrier 233 is movable with respect to the base 21 in another direction having different directional components from what the direction of movement of the first carrier 232 has.

Figure 5A:
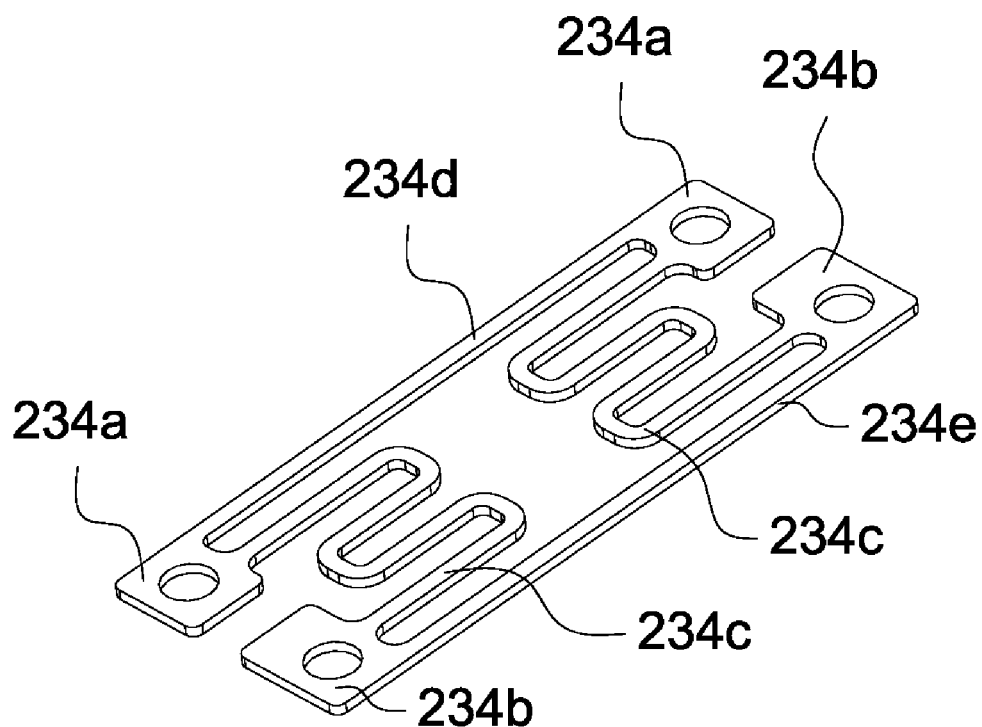
FIG. 5A is a schematic diagram of a planar elastomer in accordance with the first embodiment of the invention.
Figure 5B:
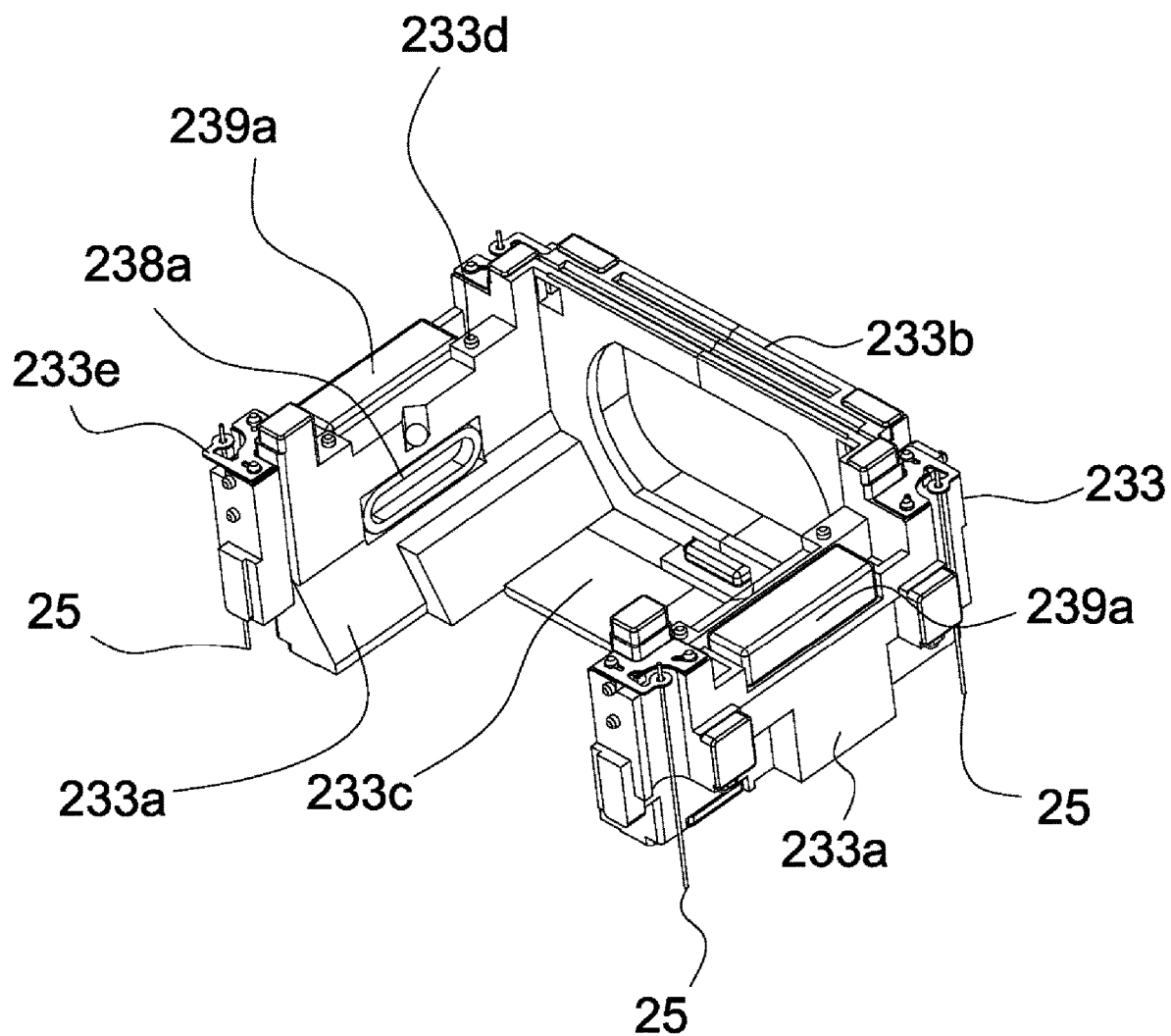
FIG. 5B is a schematic diagram of a second carrier of the lens device in accordance with the first embodiment of the invention.

FIG. 5B is a schematic diagram of the second carrier 233 of the lens device 20 in accordance with the first embodiment of the invention. As shown in FIGS. 4 and 5B, the second carrier 233 includes two side walls 233a disposed opposite to each other, an end wall 233b connected to the side walls 233a, and a bottom plate 233c connected to the bottom portions of the side walls 233a. The end wall 233b is disposed close to the imaging module 24. The inner surfaces of the side walls 233a correspond to the outer surfaces of peripheral walls 232a of the first carrier 232 in shape. A plurality of second planar-elastomer connecting portions 233d are oppositely disposed on top surfaces of the side walls 233a. The second planar-elastomer connecting portions 233d may be, for example, protrusions.

FIG. 5A is a schematic diagram of a planar elastomer 234 in accordance with the first embodiment of the invention. As shown in FIGS. 4 and 5, the lens module 23 further includes planar elastomers 234. The planar elastomers 234 are connected between the top portions of the peripheral walls 232a of the first carrier 232 and the top portions of the side walls 233a of the second carrier 233, thereby generating a connection therebetween and providing a restoring force for return of the first carrier 232 and the second carrier 233 when the first carrier 232 and the second carrier 233 are moved away from each other in the second direction Z. In the first embodiment, the planar elastomers 234 are elastic pieces. Specifically, each planar elastomer 234 includes first carrier connecting portions 234a, second carrier connecting portions 234b, and meandering portions 234c connected between the first carrier connecting portions 234a and the second carrier connecting portions 234b. In the first embodiment, there are two planar elastomers 234. Each planar elastomer 234 has two first carrier connecting portions 234a connected by a first connecting strip 234d extending in the first direction X, two second carrier connecting portions 234b connected by a second connecting strip 234e extending in the first direction X, and two meandering portions 234c connected between the first carrier connecting portions 234a and the second carrier connecting portions 234b which are disposed opposite to each other. The meandering portions 234c extend in the first direction X, turn to extend in the opposite direction, and have such extensions repeated. The planar elastomers 234 in an undeformed state extend in an XY plane defined by the first direction X and the third direction Y. The first carrier connecting portions 234a are connected to the first planar-elastomer connecting portions 232c of the first carrier 232. The second carrier connecting portions 234b are connected to the second planar-elastomer connecting portions 233d of the second carrier 233. However, the invention is not limited thereto. The planar elastomers 234 can be replaced with various springs (e.g. compression springs, extension springs, and torsion springs) which have the connecting way and connecting locations modified correspondingly.

The lateral plates 214 of the base 21 are connected to the lateral walls 211. The lateral plates 214 includes first portions 214a extending in the second direction Z, and second portions 214b connected to the tops of the first portions 214a and oriented perpendicular to the first portions 214a. Recesses are formed on the top surfaces of the side walls 233a of the second carrier 233, extend in the first direction X, and have a length (measuring in the first direction X) greater than the second portions 214b of the lateral plates 214 of the base 21. The second portions 214b are placed above the recesses. Further, the second portions 214b are movable with respect to the recesses.

The lens module 23 further includes axial elastomers 25 extending in the second direction Z to connect the second carrier 233 and the base 21. The axial elastomers 25 are flexible. For example, the axial elastomers 25 are elastic thin rods. The axial elastomers 25 can be bent at one end when an external force is applied thereto and be restored when the external force is removed. In the first embodiment, there are four axial elastomers 25 extending in the second direction Z. Each of the axial elastomers 25 has an end connected to a top corner of the second carrier 233 and another end connected to a corner of the second portion 214b of the base 21. By such arrangement, the axial elastomer 25 can have a sufficient length for being deformed. In the first embodiment of the invention, the second carrier 233 further includes four connecting elements 233e fixed to four top corners of the side walls 233a and extended beyond the edges of the side walls 233a. The lower end of the axial elastomer 25 is welded to the base 21 while the upper end of the axial elastomer 25 is connected to the connecting element 233e. Preferably, the connecting elements 233e are beam springs. Each of the connecting elements 233e has a first part fixed to the second carrier 233, and a second part which is curved, extending from the first part and connecting to the axial elastomer 25. The number and the arrangement of the axial elastomers 25 are not limited thereto. For example, two, three or five axial elastomers may be used.

When the second carrier 233 is moved with respect to the base 21, the axial elastomer 25 can be deformed with respect to its lower end via the flexibility. When the electromagnetic force is eliminated, the second carrier 233 can return to its original location under the action of the axial elastomer 25.

A first directional driving element is disposed between the second carrier 233 and the base 21. Specifically, the first directional driving element is disposed between the bottom of the second carrier 233 and the base wall 212 of the base 21. In the first embodiment of the invention, the first directional driving element includes at least one coil 237a and at least one magnet 237b. The coil 237a is disposed on the bottom of the second carrier 233 and the magnet 237b is disposed on the base wall 212 of the base 21. Alternatively, the magnet 237b is disposed on the bottom of the second carrier 233 and the coil 237a is disposed on the base wall 212 of the base 21. The bottom of the second carrier 233 has a recess for accommodating the coil 237a or the magnet 237b. The invention may provide two coils 237a and two magnets 237b which are symmetrically arranged with respect to the optical axis of the lens module 23. When electric currents are passed through the coils 237a, the second carrier 233 is driven by an electromagnetic force to move with respect to the base 21 in the first direction X, and the lens unit 231 is moved along with the second carrier 233 in the first direction X to perform an auto focus operation. It is noted that the location of the lens unit 231 is limited by the second portions 214b of the lateral plates 214 of the base 21. When the electromagnetic force is eliminated, the second carrier 233 returns to its original location under the action of the axial elastomers 25.

A second directional driving element is disposed between the first carrier 232 and the second carrier 233. Specifically, the second directional driving element is disposed between the outer surfaces of the peripheral walls 232a of the first carrier 232 and the inner surfaces of the side walls 233a of the second carrier 233. When observed in the second direction Z, the second directional driving element is disposed between the middle parts of the outer surfaces of the peripheral walls 232a of the first carrier 232 and the middle parts of the inner surfaces of the side walls 233a of the second carrier 233. In the first embodiment of the invention, the second directional driving element includes at least one coil 238a and at least one magnet 238b. The coil 238a is disposed on the outer surface of the peripheral wall 232a of the first carrier 232 and the magnet 238b is disposed on the inner surface of the side wall 233a of the second carrier 233. Alternatively, the coil 238a is disposed on the inner surface of the side wall 233a of the second carrier 233 and the magnet 238b is disposed on the outer surface of the peripheral wall 232a of the first carrier 232. The outer surface of the peripheral wall 232a of the first carrier 232 and the inner surface of the side wall 233a of the second carrier 233 have recesses for accommodating the coil 238a and the magnet 238b. The invention may provide two coils 238a and two magnets 238b which are symmetrically arranged with respect to the optical axis of the lens module 23. When electric currents are passed through the coils 238a, the first carrier 232 is driven by an electromagnetic force to move with respect to the second carrier 233 in the second direction Z, and the lens unit 231 is moved along with the first carrier 232 in the second direction Z. When the electromagnetic force and the restoring force of the planar elastomer 234 are in balance, the first carrier 232 is kept steady with respect to the second carrier 233. When the electromagnetic force is eliminated, the first carrier 232 returns to its original location by the restoring force of the planar elastomer 234.

A third directional driving element is disposed between the second carrier 233 and the base 21. Specifically, the third directional driving element is disposed between the top portions of the side walls 233a of the second carrier 233 and the second portions 214b of the lateral walls 214 of the base

21. In the first embodiment of the invention, the third directional driving element includes magnets 239a and coils 239b disposed on the top portions of the side walls 233a of the second carrier 233 and the bottoms of the second portions 214b of the lateral plates 214 of the base 21. For example, one of the magnets 239a is disposed in a recess of the top portion of one side wall 233a of the second carrier 233 and the corresponding coil 239b is disposed on the bottom of the second portion 214b of one lateral plate 214 of the base 21. Alternatively, the magnet 239a is disposed on the bottom of the second portion 214b of the lateral plate 214 of the base 21 and the corresponding coil 239b is disposed in the recess of the top portion of one side wall 233a of the second carrier 233. When electric currents are passed through the coils 239b, an electromagnetic force at one side of the second carrier 233 is smaller than another electromagnetic force at another side of the second carrier 233. Thus, the second carrier 233 is forced to move with respect to the base 21 in the third direction Y, and the lens unit 231 is moved along with the second carrier 233 in the third direction Y. It is noted that the location of the lens unit 231 is limited by the second portions 214b of the lateral plates 214 of the base 21. When the electromagnetic forces are eliminated, the second carrier 233 returns to its original location under the action of the axial elastomers 25.

The lens device 20 further includes a voice coil motor (not shown). The first, second and third directional driving elements are electrically connected to the voice coil motor. Thus, the coils of the first, second and third directional driving elements can be provided with power through the voice coil motor. The lens device 20 further includes a sensor electrically connected to the voice coil motor. The sensor is used for sensing the vibrations of the lens device 20 and correspondingly driving the lens unit 231 to move in the second direction Z or the third direction Y in order to compensate for the vibrations. Accordingly, a clear image can be obtained.

The axial elastomer of the first embodiment can be modified to extend in the first direction X, wherein an end of the axial elastomer is connected to the side wall of the base 21 adjacent to the imaging module 24, and the other end is connected to the end portion of the side wall 233a of the second carrier 233 adjacent to the prism module 22. Further, a connecting element is fixed to the end portion of the side wall 233a of the second carrier 233 adjacent to the prism module 22. Such arrangement is similar to that of the following third embodiment and the descriptions thereof are thus omitted.

Further, similar to that of the third embodiment, the first directional driving element is disposed between the middle part of the outer surface of the peripheral wall 232a of the first carrier 232 and the middle part of the inner surface of the side wall 233a of the second carrier 233. When electric currents are passed through the coils, the first carrier 232 is driven by an electromagnetic force to move with respect to the second carrier 233 in the first direction X, and the lens unit 231 is moved along with the first carrier 232 in the first direction X to perform an auto focus operation. Also, the location of the second directional driving element is changed. The second directional driving element is disposed between the side wall 233a of the second carrier 233 and the first portion 214a of the lateral plate 214 of the base 21. When electric currents are passed through the coils of the second directional driving element, the second carrier 233 is driven by an electromagnetic force to move with respect to the base 21 in the second direction Z. When the electromagnetic force is eliminated, the second carrier 233 returns to its original location under the action of the axial elastomer 27. The third directional driving element is disposed between the top portion of the side wall 233a of the second carrier 233 and the second portion 214b of the lateral plate 214 of the base 21. When electric currents are passed through the coils, an electromagnetic force at one side of the second carrier 233 is smaller than another electromagnetic force at another side of the second carrier 233. Thus, the second carrier 233 is forced to move with respect to the base 21 in the third direction Y, and the lens unit 231 is moved along with the second carrier 233 in the third direction Y. When the electromagnetic forces are eliminated, the second carrier 233 returns to its original location under the action of the axial elastomers 27. The shape of the planar elastomer 234 can be adapted to requirements. For example, the meandering portion is adapted to extend in the third direction Y. Other arrangements are similar to those of the third embodiment and the descriptions thereof are thus omitted.

In the invention, the movements in the first direction for performing an auto focus operation and the movements in the second and third directions for compensation of vibrations are accomplished by means of a single voice coil motor. Therefore, the control is simplified and the adjustment becomes convenient.

Figure 6:
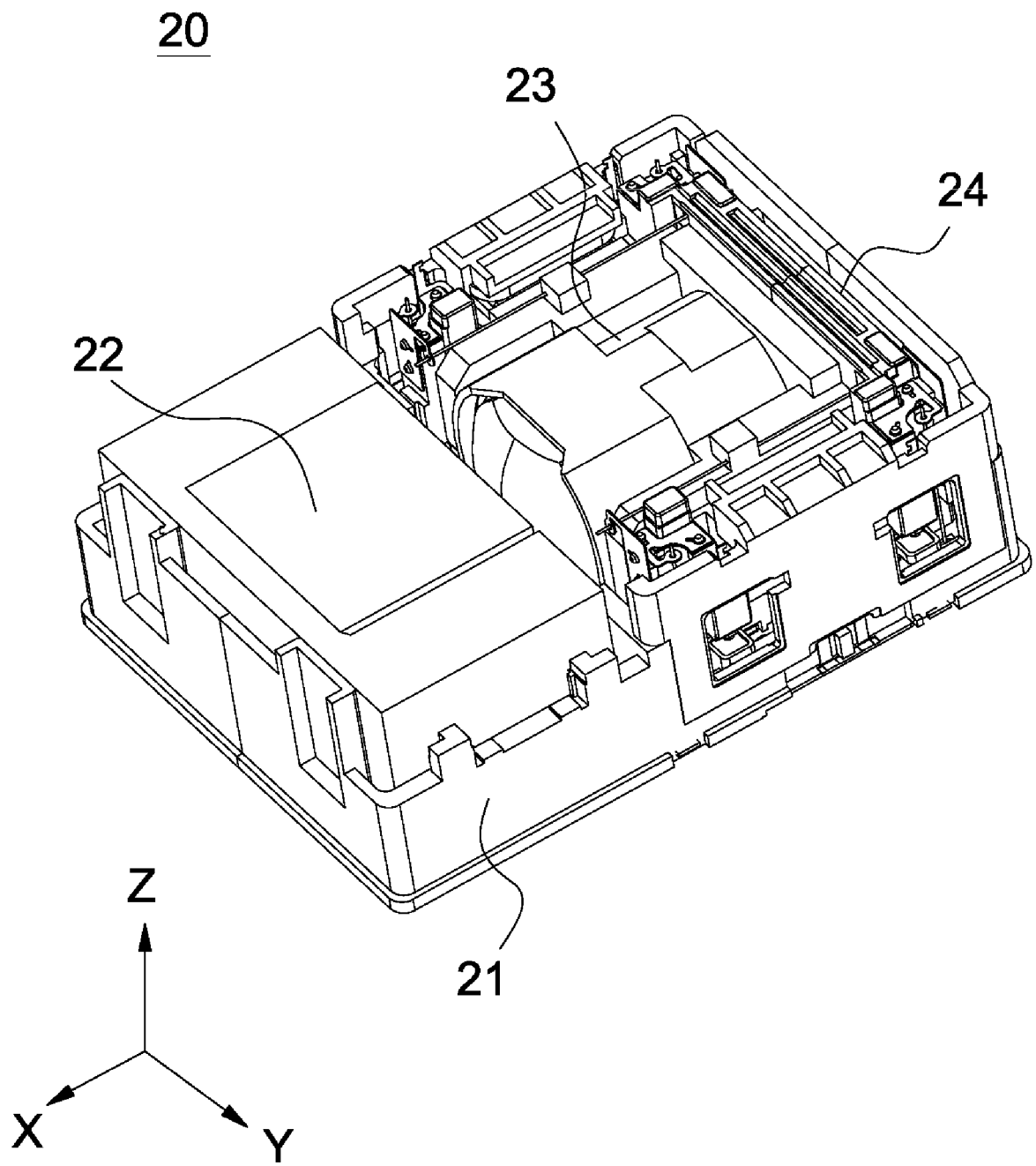
FIG. 6 is a schematic diagram of a lens device in accordance with a second embodiment of the invention.
Figure 7A:
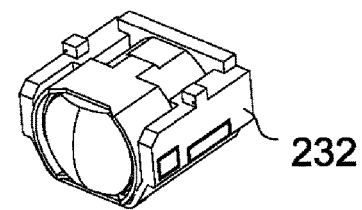
FIG. 7A is an exploded diagram of the lens device in accordance with the second embodiment of the invention.
Figure 7A:
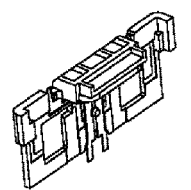
Figure 7A:
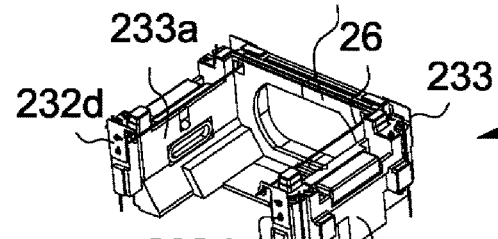
Figure 7A:
Figure 7A:
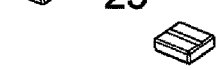
Figure 7A:
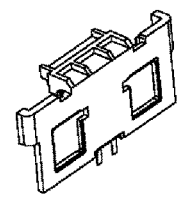
Figure 7A:
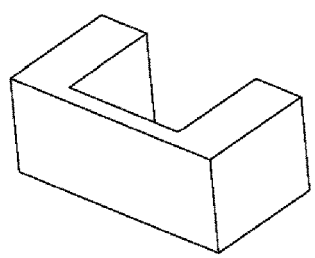
Figure 7A:
Figure 7A:
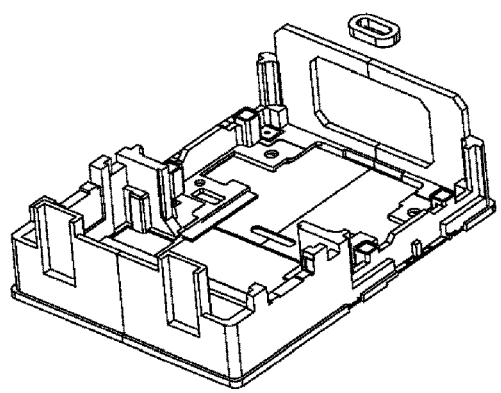
Figure 7A:
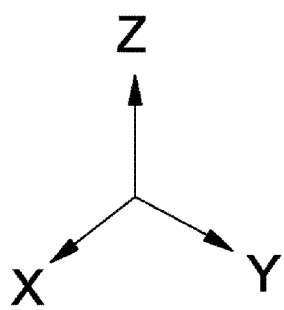
Figure 7B:
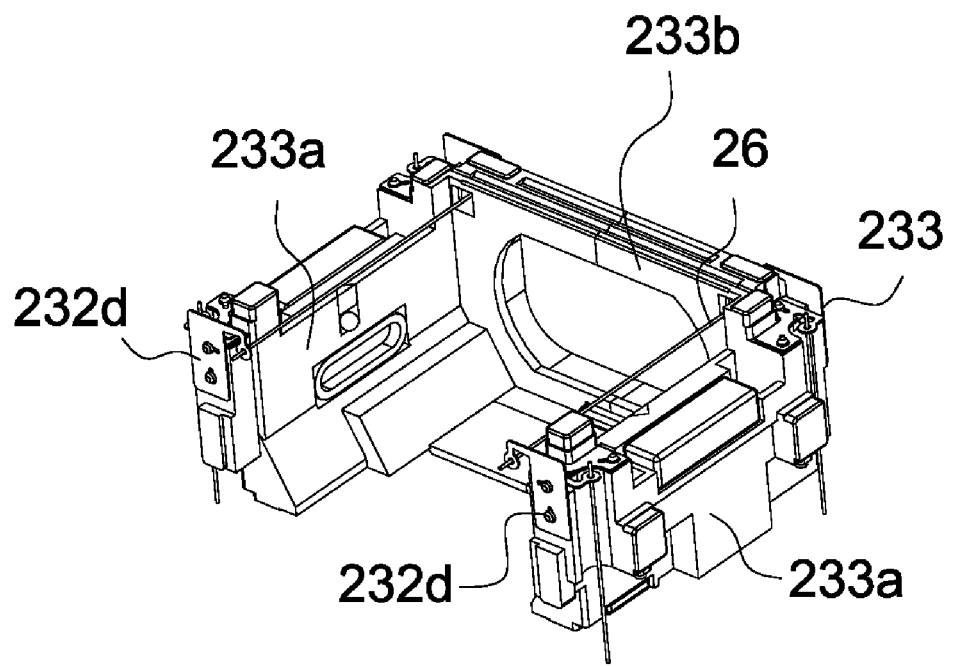
FIG. 7B is a schematic diagram of a second carrier of the lens device in accordance with the second embodiment of the invention.

FIG. 6 is a schematic diagram of the lens device 20 in accordance with the second embodiment of the invention. FIG. 7A is an exploded diagram of the lens device 20 in accordance with the second embodiment of the invention. FIG. 7B is a schematic diagram of the second carrier 233 of the lens device 20 in accordance with the second embodiment of the invention. In the second embodiment, the parts similar to those of the first embodiment will not be described. As shown in FIGS. 6, 7A and 7B, in the second embodiment, the first carrier 232 and the second carrier 233 are connected by inter-carrier axial elastomers 26 (extending in the first direction X) rather than planar elastomers. Each of the inter-carrier axial elastomers 26 has a first end fixed to the end wall 233b of the second carrier 233, and a second end fixed to the end surface of the side wall 233a of the second carrier 233. The inter-carrier axial elastomer 26 extending in the first direction X is penetrated through the first carrier 232. A plurality of connecting elements 232d are disposed on the end wall 233b and the end surfaces of the side walls 233a of the second carrier 233. The first end of the inter-carrier axial elastomer 26 is fixed to a connecting element 232d disposed on the end wall 233b, while the second end of the inter-carrier axial elastomer 26 is fixed to another connecting element 232d disposed on the end surface of the side wall 233a. Similar to that of the first embodiment, the connecting element 232d includes a first part and a second part extending from the first part. The second part is curved and is connected to the inter-carrier axial elastomer 26. The curved second part is in a plane perpendicular to the first direction X and extends towards the first carrier 232. It is noted that the second part is narrow, long and curved in structure. Therefore, the second part will be pulled by the inter-carrier axial elastomer 26 and deformed if the inter-carrier axial elastomer 26 is subjected to deformation in the second direction Z.

When the first carrier 232 is moved with respect to the second carrier 233 in the second direction Z by an electromagnetic force of the second directional driving element, the inter-carrier axial elastomer 26 (extending in the second direction Z) is subjected to deformation due to the movement of the first carrier 232, and the lens unit 231 is moved along with the first carrier 232 in the second direction Z. If the electromagnetic force is eliminated, then the first carrier 232 will returns to its original location under the action of the inter-carrier axial elastomer 26.

The invention is not limited to the above arrangement. For example, the first end of the inter-carrier axial elastomer 26 may be fixed to the end wall 233b of the second carrier 233 while the second end is fixed to the end surface of the first carrier 232 (adjacent to the prism module 22) through a connecting element. Such arrangement enables the inter-carrier axial elastomer 26 to function the same.

Similar to those of the first embodiment, the base 21 and the second carrier 233 of the second embodiment are connected through the axial elastomers 25. Further, the axial elastomers 25 can be selectively oriented in two different directions. Specifically, the axial elastomers 25 can be oriented either in the first direction X or in the second direction Z, with the first, second and third directional driving elements correspondingly disposed.

When the axial elastomer 25 is oriented in the first direction X, an end of the axial elastomer 25 and an end of the inter-carrier axial elastomer 26 are connected to the same connecting element (i.e. the connecting element 232d on the side wall 233a of the second carrier 233). Under such circumstance, the connecting element 232d may include a first part, a second part extending from the first part, and a third part also extending from the first part. The second part is curved and connected to the inter-carrier axial elastomer 26. The third part is curved and connected to the axial elastomer 25. The second part and the third part may have the same shape, extend in a plane perpendicular to the first direction X, and extend towards the base 21.

Figure 8:
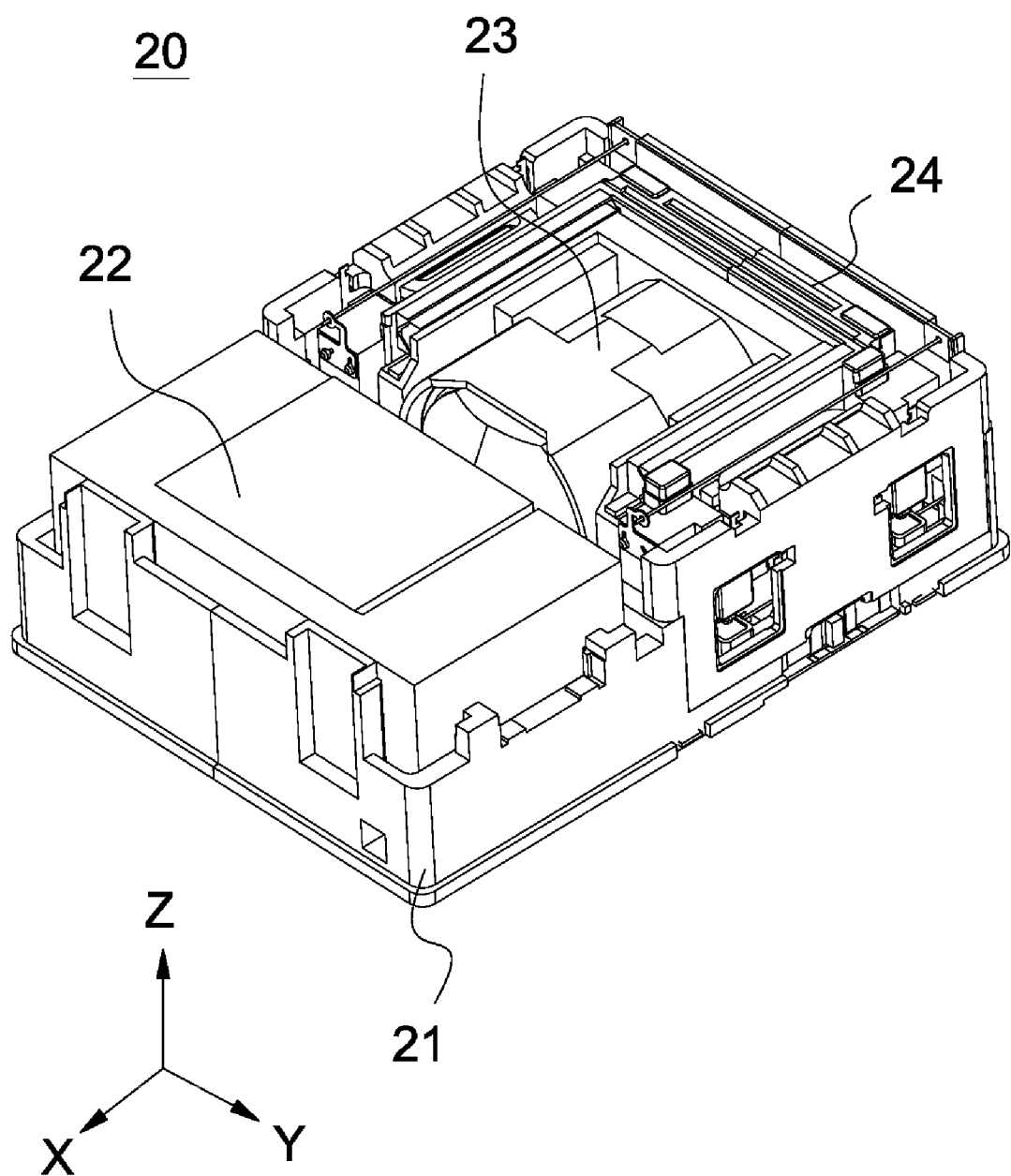
FIG. 8 is a schematic diagram of a lens device in accordance with a third embodiment of the invention.
Figure 9:
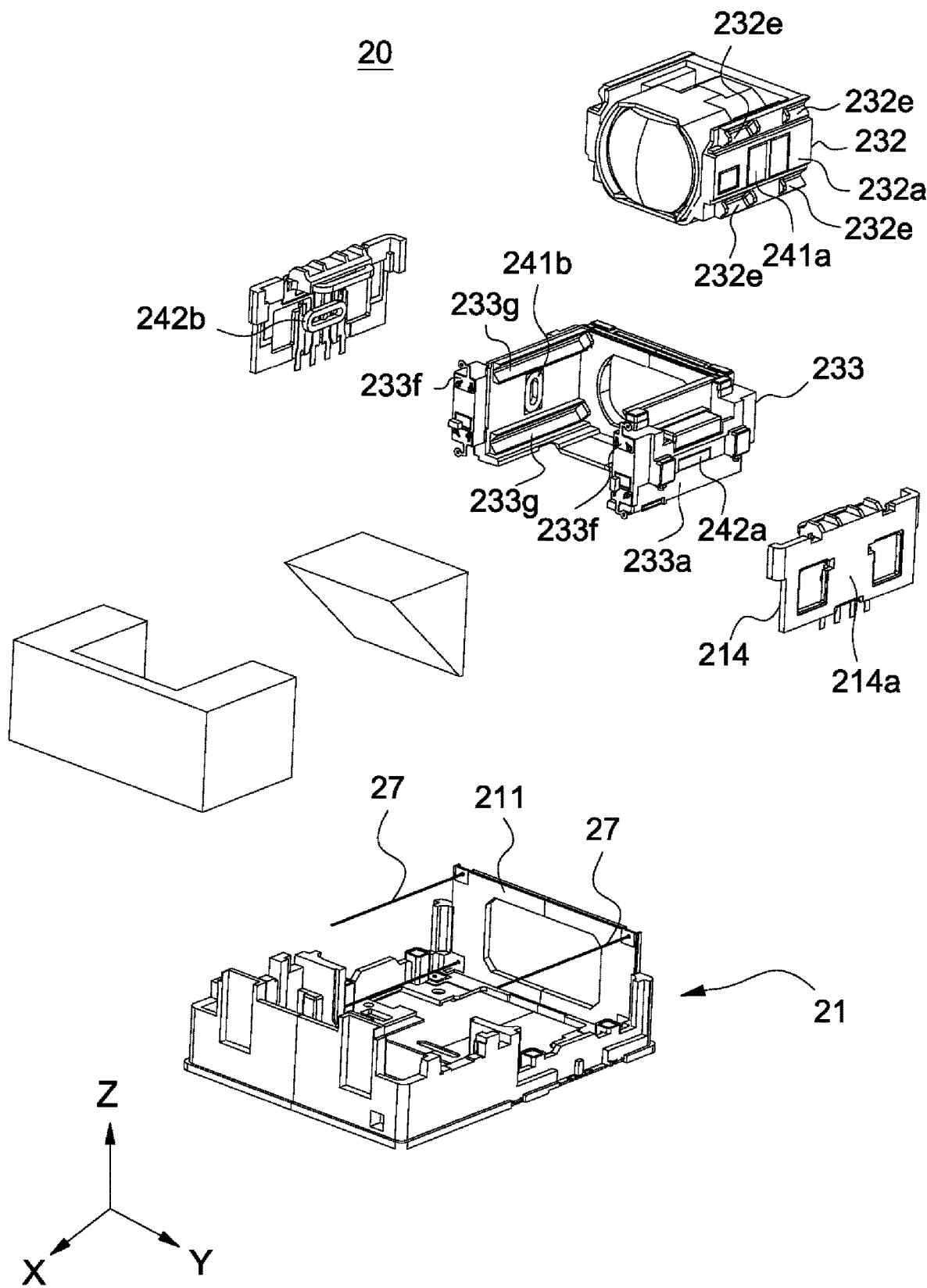
FIG. 9 is an exploded diagram of the lens device in accordance with the third embodiment of the invention.

FIG. 8 is a schematic diagram of the lens device 20 in accordance with the third embodiment of the invention. FIG. 9 is an exploded diagram of the lens device 20 in accordance with the third embodiment of the invention. In the third embodiment, the parts similar to those of the first embodiment will not be described. As shown in FIGS. 8 and 9, in the third embodiment, the first carrier 232 and the second carrier 233 are not connected through the planar elastomers. First guide grooves 232e and second guide grooves 233g are respectively provided on the outer surfaces of the peripheral walls 232a of the first carrier 232 and the inner surfaces of the side walls 233a of the second carrier 233. Balls (not shown) are disposed in the first guide grooves 232e and second guide grooves 233g. Specifically, the first guide grooves 232e are provided on the upper parts and lower parts of the outer surfaces of the peripheral walls 232a of the first carrier 232. The second guide grooves 233g are provided on the upper parts and lower parts of the inner surfaces of the side walls 233a of the second carrier 233. Both of the first guide grooves 232e and the second guide grooves 233g extend in the first direction X. Each ball has a part disposed in a first guide groove 232e and another part disposed in the second guide groove 233g. Thus, the first carrier 232 and the second carrier 233 are connected through the balls, and the first carrier 232 is movable with respect to the second carrier 233 in the first direction X.

A first directional driving element is disposed between the first carrier 232 and the second carrier 233. Specifically, the first directional driving element is disposed between the middle parts of the outer surfaces of the peripheral walls 232a of the first carrier 232 and the middle parts of the inner surfaces of the side walls 233a of the second carrier 233. The first directional driving element includes at least one magnet 241a and at least one coil 241b. The magnet 241a is disposed on the outer surface of the peripheral wall 232a of the first carrier 232 and the coil 241b is disposed on the inner surface of the side wall 233a of the second carrier 233. Alternatively, the magnet 241a is disposed on the inner surface of the side wall 233a of the second carrier 233 and the coil 241b is disposed on the outer surface of the peripheral wall 232a of the first carrier 232. The outer surface of the peripheral wall 232a of the first carrier 232 and the inner surface of the side wall 233a of the second carrier 233 have recesses for accommodating the magnet 241a and the coil 241b. The invention may provide two coils 241b and two magnets 241a which are symmetrically arranged with respect to the optical axis of the lens module 23. When electric currents are passed through the coils 241b, the first carrier 232 is driven by an electromagnetic force to move with respect to the second carrier 233 in the first direction X, and the lens unit 231 is moved along with the first carrier 232 in the first direction X to perform an auto focus operation.

In the third embodiment, the base 21 and the second carrier 233 are connected through axial elastomers 27. However, the connecting locations and orientations of the axial elastomers 27 are different from those of the first embodiment. As shown, the axial elastomers 27 extend in the first direction X. Each axial elastomer 27 has an end connected to the lateral wall 211 of the base 21 (adjacent to the imaging module 24), and another end connected to the end portion of the side wall 233a of the second carrier 233 (adjacent to the prism module 22). Specifically, the end portions of the side walls 233a of the second carrier 233 (adjacent to the prism module 22) have connecting elements 233f provided thereon. The connecting elements 233f extend beyond the end portions of the side walls 233a. Each axial elastomer 27 has an end fixed to the lateral wall 211 of the base 21 (adjacent to the imaging module 24), and another end connected to the connecting element 233f on the end portion of the side wall 233a of the second carrier 233.

The location of the second directional driving element of the third embodiment is different from that of the first embodiment. In the third embodiment, the second directional driving element is disposed between the side wall 233a of the second carrier 233 and the first portion 214a of the lateral plate 214 of the base 21. The second directional driving element includes magnets 242a and coils 242b. The magnets 242a are disposed on the side walls 233a of the second carrier 233, and the coils 242b are disposed on the first portions 214a of the lateral plates 214 of the base 21. Alternatively, the magnets 242a are disposed on the first portions 214a of the lateral plates 214 of the base 21, and the coils 242b are disposed on the side walls 233a of the second carrier 233. When electric currents are passed through the coils 242b, the second carrier 233 is driven by an electromagnetic force to move with respect to the base 21 in the second direction Z. When the electromagnetic force is eliminated, the second carrier 233 returns to its original location under the action of the axial elastomers 27.

The location of the third directional driving element of the third embodiment is similar with that of the first embodiment and the descriptions thereof are thus omitted.

Figure 10:
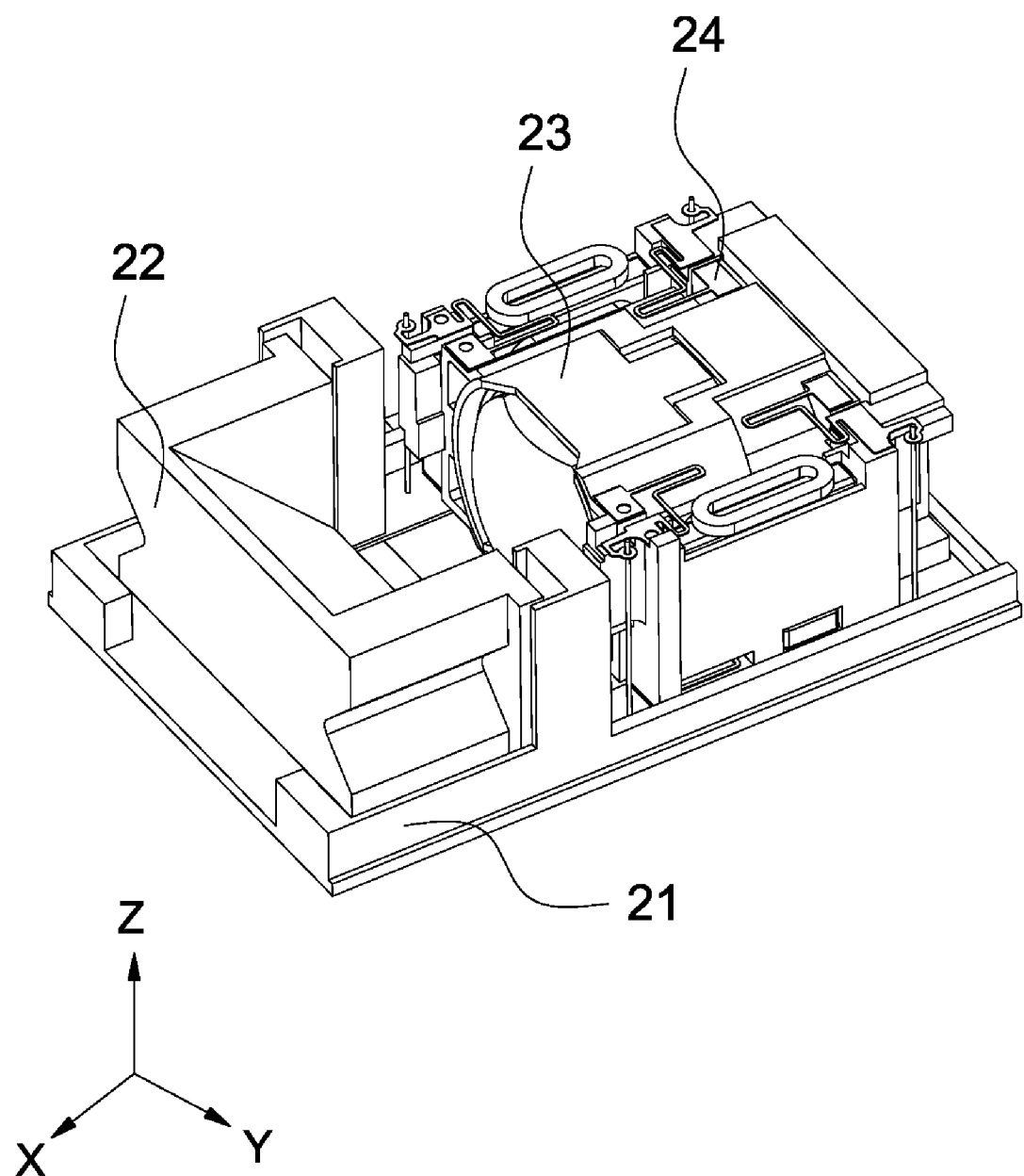
FIG. 10 is a schematic diagram of a lens device in accordance with a fourth embodiment of the invention.
Figure 11:
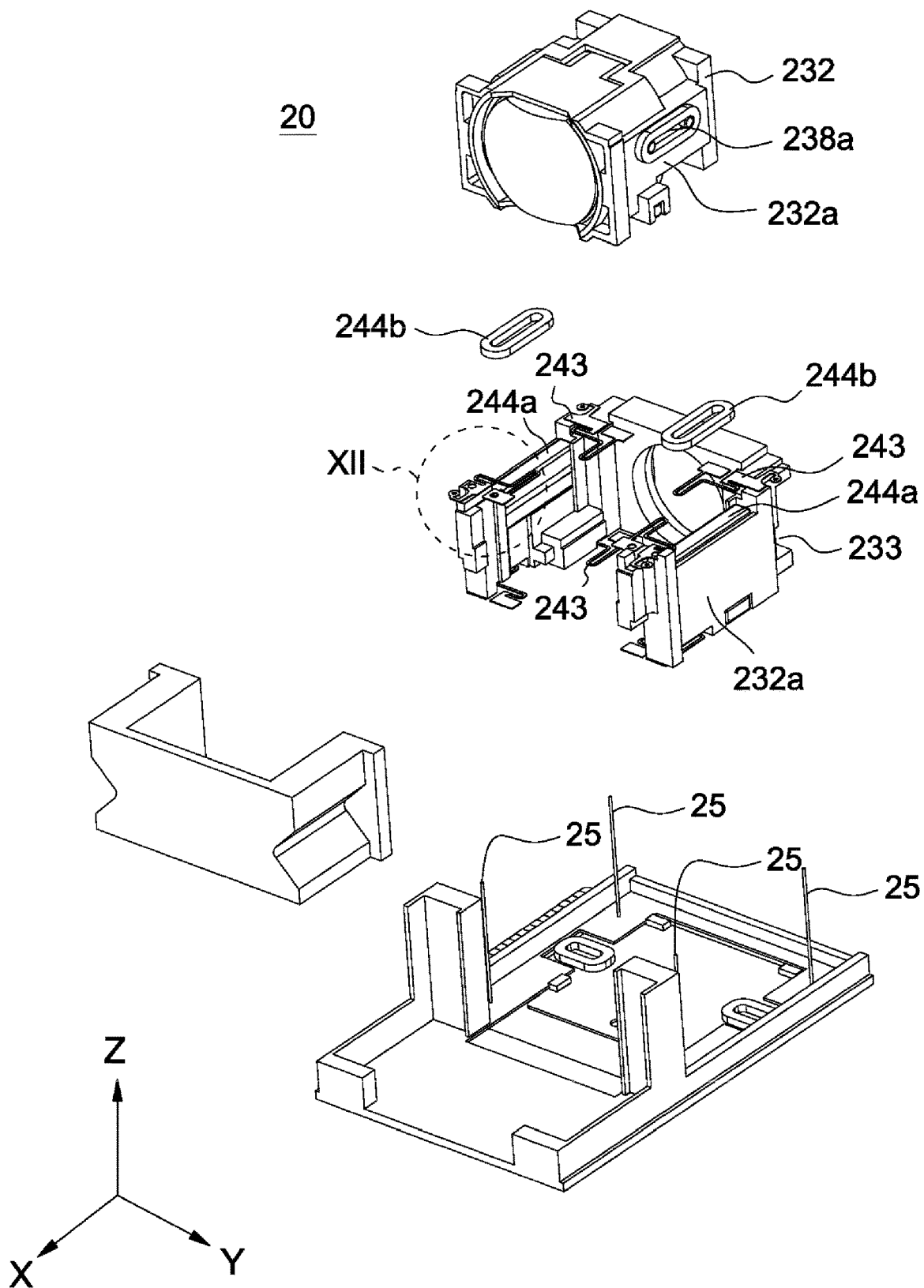
FIG. 11 is an exploded diagram of the lens device in accordance with the fourth embodiment of the invention.
Figure 12:
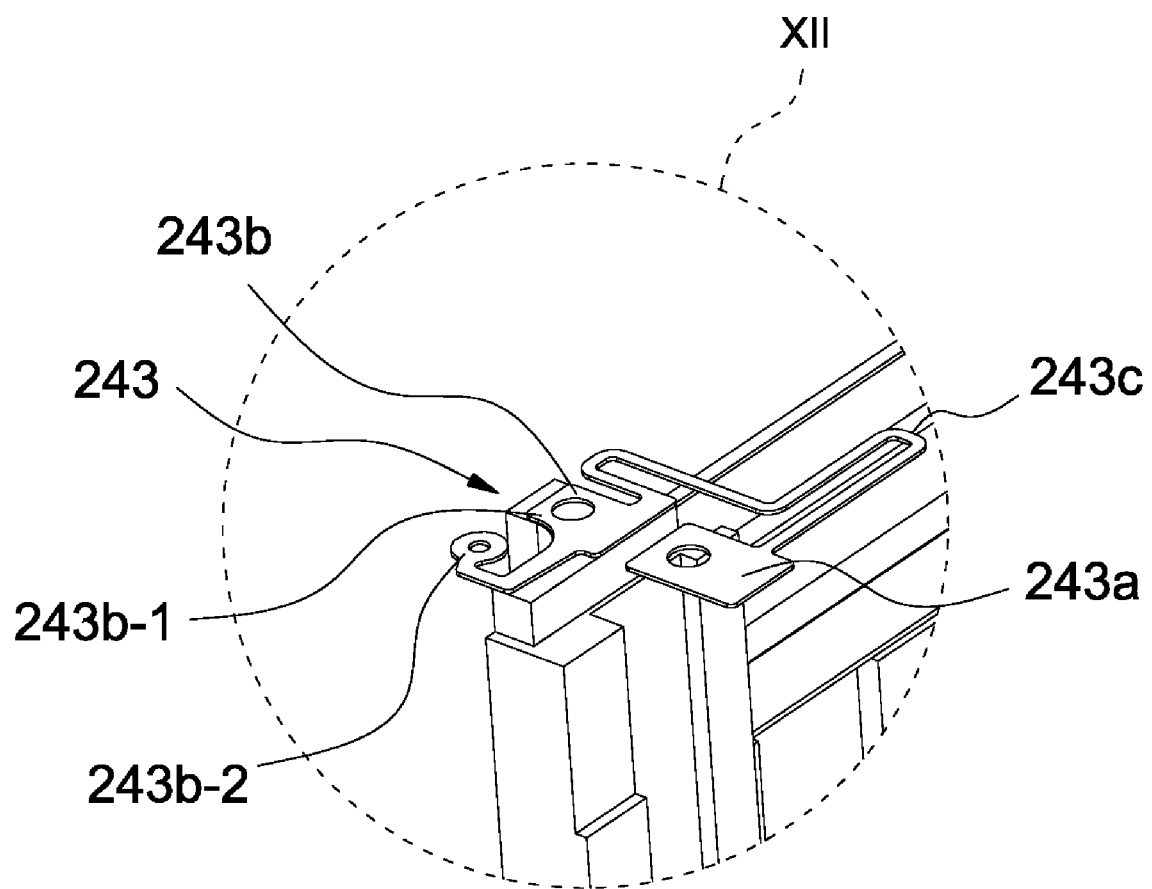
FIG. 12 is a partial enlarged diagram of a second carrier of the lens device in accordance with the fourth embodiment of the invention.

FIG. 10 is a schematic diagram of the lens device 20 in accordance with the fourth embodiment of the invention. FIG. 11 is an exploded diagram of the lens device 20 in accordance with the fourth embodiment of the invention. FIG. 12 is a partial enlarged diagram of the second carrier of the lens device 20 in accordance with the fourth embodiment of the invention. In the fourth embodiment, the parts similar to those of the first embodiment will not be described. As shown in FIGS. 10, 11 and 12, in the fourth embodiment, the structure of the planar elastomers are modified. Each of the planar elastomers 243 is connected between the top corner of the peripheral wall 232a of the first carrier 232 and the top corner of the side wall 233a of the second carrier 233, and has a first carrier connecting portion 243a, a second carrier connecting portion 243b and a meandering portion 243c connected between the first carrier connecting portion 243a and the second carrier connecting portion 243b.

It is worth noting that in the fourth embodiment the second carrier connecting portion 243b has the same function as the connecting element 233e of the first embodiment, i.e. for connecting to the axial elastomer 25. Specifically, the second carrier connecting portion 243b is connected to the upper end of the axial elastomer 25. The second carrier connecting portion 243b includes a first part 243b-1 connected to the top portion of the side wall 233a of the second carrier 233, and a second part 243b-2 extending from the first part 243b-1 and beyond the second carrier 233. Further, the second part 243b-2 is narrow, long and curved. The second part 243b-2 and the meandering portion 243c are disposed at opposite sides of the first part 243b-1. In the fourth embodiment, the meandering portion 243c extends in the first direction X and the third direction Y. In detail, the meandering portion 243c has a part extending in the third direction Y from the first part 243b-1 and turning to extend in a direction opposite to the third direction Y. Also, the meandering portion 243c has another part extending in the first direction X from the first carrier connecting portion 243a and turning to extend in a direction opposite to the first direction X. Such structure enables the meandering portion 243c to be deformed, thereby providing a restoring force when the first carrier 232 is moved with respect to the second carrier 233 in the second direction Z. Also, when the first carrier 232 is moved with respect to the second carrier 233 in the first direction X and third direction Y, the meandering portion 243c can be deformed and spread in a limited range in the corresponding directions to provide another restoring force.

The lens module 23 further includes axial elastomers 25 extending in the second direction Z. The lower end of the axial elastomer 25 is welded to the base 21 while the upper end is connected to the second part 243b-2 of the second carrier connecting portion 243b of the planar elastomer 243.

In the fourth embodiment, the base 21 does not include the side walls and side plates. The location of the third directional driving element is changed. Specifically, the third directional driving element is disposed on the top portions of the side walls 233a of the second carrier 233 and at both sides of the top portion of the first carrier 232. In the fourth embodiment of the invention, the third directional driving element includes magnets 244a disposed on the top portions of the side walls 233a of the second carrier 233 and coils 244b disposed at both sides of the top portion of the first carrier 232.

Similar to that of the first embodiment, the second directional driving element may be disposed between the outer surfaces of the peripheral walls 232a of the first carrier 232 and the inner surfaces of the side walls 233a of the second carrier 233.

A modified embodiment is as shown in FIGS. 10 and 11, wherein the second directional driving element and the third directional driving element have the common magnets 244a. Because the magnets 244a are of certain thickness, the coils 238a of the second directional driving element are disposed on the outer surfaces of the peripheral walls 232a of the first carrier 232 and beside the magnets 244a. When electric currents are passed through the coils 238a of the second directional driving element, the first carrier 232 is moved in the second direction Z by an electromagnetic force. When other electric currents are passed through the coils 244b of the third directional driving element, the first carrier 232 is moved in the third direction Y by another electromagnetic force.

In another modified embodiment, the base 21 includes the lateral walls and lateral plates as described in the first embodiment. The base 21 and the second carrier 233 are connected through the axial elastomers 25. The axial elastomers 25 can be selectively oriented in two different directions. Specifically, the axial elastomers 25 can be oriented either in the first direction X or in the second direction Z, with the first, second and third directional driving elements correspondingly disposed. When the axial elastomers 25 are oriented in the first direction X, the second part 243b-2 of each second carrier connecting portion 243b is bent at ninety degrees to extend in the second direction Z. That is, the second part 243b-2 is in a plane perpendicular to the first direction X. Further, an end of the axial elastomer 25 is connected to the side wall of the base 21 and another end is connected to the second part 243b-2.

Figure 13:
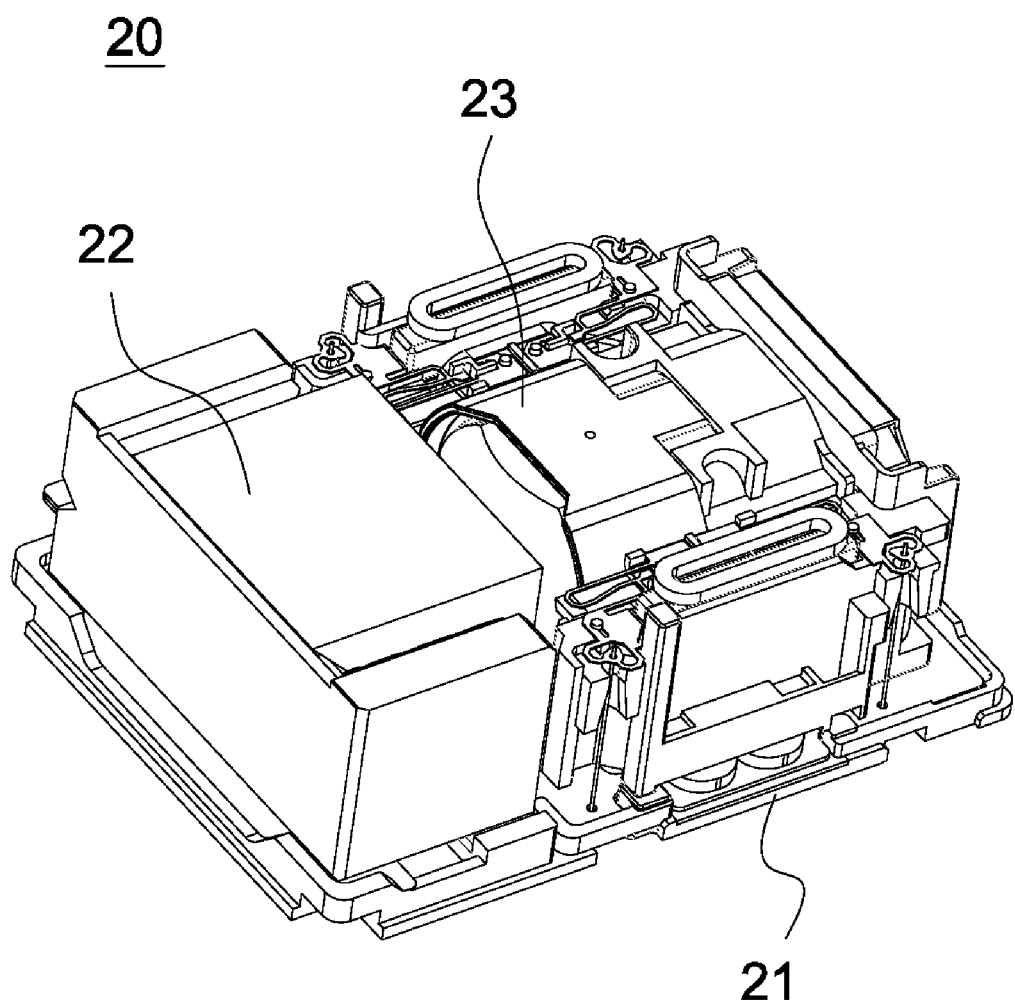
FIG. 13 is a schematic diagram of a lens device in accordance with a fifth embodiment of the invention.
Figure 14:
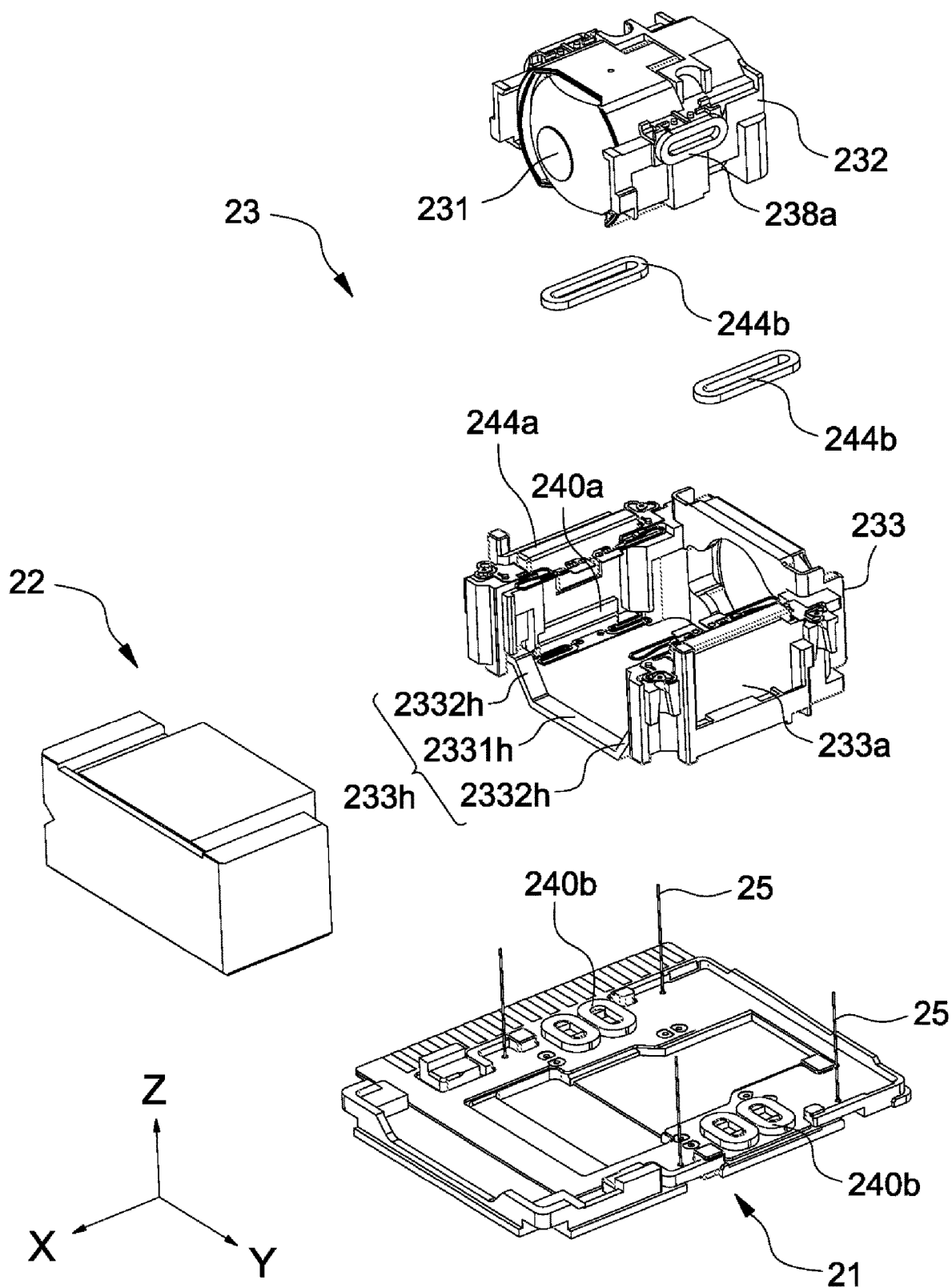
FIG. 14 is an exploded diagram of the lens device in accordance with the fifth embodiment of the invention.

FIG. 13 is a schematic diagram of the lens device 20 in accordance with the fifth embodiment of the invention. FIG. 14 is an exploded diagram of the lens device 20 in accordance with the fifth embodiment of the invention. In the fifth embodiment, the parts similar to those of the fourth embodiment will not be described. As shown in FIGS. 13 and 14, in the fifth embodiment, an elongated connecting portion 233h is connected to the bottom portions of the side walls 233a of the second carrier 233. The connecting portion 233h is extended in the third direction Y and bent downwards so that both ends of the connecting portion 233h are higher than the middle of the connecting portion 233h. Specifically, the connecting portion 233h includes a horizontal section 2331h and two inclined sections 2332h. The inclined sections 2332h are disposed at both sides of the horizontal section 2331h and each of inclined sections 2332h is slanted to extend downwards from the bottom portion of the side wall 233a of the second carrier 233 to the horizontal section 2331h. Therefore, the height of the horizontal section 2331h is different from those of the inclined sections 2332h (i.e. the location of the horizontal section 2331h is different from those of the inclined sections 2332h in the second direction Z or for Z-coordinate). The structural strength of the second carrier 233 can be enhanced by the connecting portion 233h. Accordingly, the lens module 23 becomes more reliable under an external impact or in a drop test. Besides, the height of the lens module 23 in the second direction Z can be reduced.

In a modified example, the connecting portion is connected to the top portions of the side walls 233a of the second carrier 233. The connecting portion 233h is bent upwards so that both ends of the connecting portion 233h are lower than the middle of the connecting portion 233h. In another modified example, two connecting portions are provided and respectively connected to the top portions and bottom portions of the side walls 233a of the second carrier 233. In either of the modified examples, the second carrier 233 has enhanced structural strength.

It is worth noting that the number of the coils disposed on the base 21 in the fifth embodiment is different from that in the fourth embodiment. In the fifth embodiment, the number of the coils 240b of the first directional driving element disposed on the base 21 is increased to four, wherein two coils 240b and two other coils 240b are symmetrically arranged with respect to the optical axis of the lens module 23, and two magnets 240a are correspondingly disposed on the lower parts of the inner surfaces of the second carrier 233. When electric currents are passed through the coils 240*b*, the second carrier 233 is driven by an electromagnetic force to move with respect to the base 21 in the first direction X and the first carrier 232 and lens unit 231 are moved along with the second carrier 233 in the first direction X to perform an auto focus operation. Thus, the operation of driving the second carrier 233 of the fifth embodiment becomes more stable and reliable because the number of the coils 240*b* of the first directional driving element disposed on the base 21 is increased to four.

Figure 15:
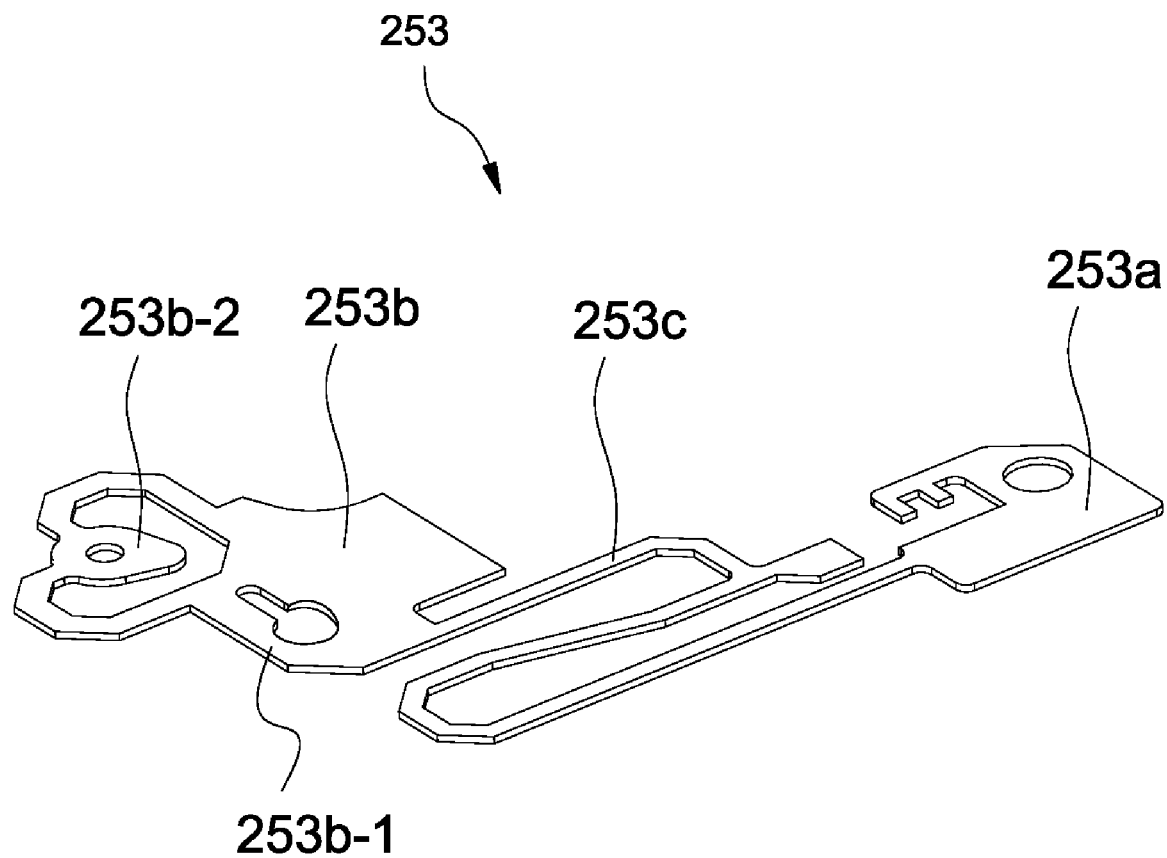
FIG. 15 is a schematic diagram of a planar elastomer in accordance with a fifth embodiment of the invention.

It is also worth noting that the shape of the planar elastomers of the fifth embodiment is different from that of the fourth embodiment. FIG. 15 is a schematic diagram of a planar elastomer in accordance with a fifth embodiment of the invention. As shown in FIG. 15, in the fifth embodiment, each of the planar elastomers 253 has a first carrier connecting portion 253*a*, a second carrier connecting portion 253*b* and a meandering portion 253*c* connected between the first carrier connecting portion 253*a* and the second carrier connecting portion 253*b*. The second carrier connecting portion 253*b* is connected to the upper end of the axial elastomer 25. The second carrier connecting portion 253*b* includes a first part 253*b*-1 connected to the top portion of the side wall 233*a* of the second carrier 233, and a second part 253*b*-2 extending from the first part 253*b*-1 and beyond the second carrier 233. Further, the second part 253*b*-2 is sheet-shaped and perforated. The second part 253*b*-2 and the meandering portion 253*c* are disposed at opposite sides of the first part 253*b*-1. In the fifth embodiment, the meandering portion 253*c* extends in the first direction X and the third direction Y. In detail, the meandering portion 253*c* has a part extending in a direction opposite to the first direction X from the first part 253*b*-1 and turning to extend in the first direction X. Also, the meandering portion 253*c* has another part extending in the first direction X from the first carrier connecting portion 253*a* and turning to extend in a direction opposite to the first direction X. Such structure also enables the meandering portion 253*c* to be deformed, thereby providing a restoring force when the first carrier 232 is moved with respect to the second carrier 233 in the second direction Z.

The base 21 of the fifth embodiment can be modified to have lateral walls and lateral plates, and can be still connected to the second carrier 233 through axial elastomers 25. The axial elastomers 25 can be oriented in the first direction X or in the second direction Z, while the first, second and third directional driving elements are correspondingly arranged. The second part 253*b*-2 of the second carrier connecting portion 253*b* is bent at ninety degrees to extend in the second direction Z (i.e. the second part 253*b*-2 is in a plane perpendicular to the first direction X) when the axial elastomers 25 are oriented in the first direction X. Each of the axial elastomers 25 has an end connected to one lateral wall of the base 21 and another end connected to the second part 253*b*-2. When the first carrier 232 is moved with respect to the second carrier 233 in the first direction X, the meandering portion 253*c* can be deformed and spread in a limited range in the corresponding direction to provide a restoring force.

In the invention, the lens module 23 of the lens device 20 is used for performing the auto focus operation in the first direction X and compensation for vibrations in the second direction Z and the third direction Y. By such arrangement, only one voice coil motor is required to perform an auto focus movement in the first direction X and a vibration compensation movement in the second direction Z and the third direction Y. Therefore, the control of operation of the lens device 20 can be simplified, and the corresponding adjustments become more convenient.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An imaging device comprising:
 a base;
 a prism module fixedly disposed in the base;
 a lens module comprising a lens unit, a first carrier configured to fix the lens unit, and a second carrier configured to accommodate the first carrier, wherein the lens unit has an optical axis extending in a first direction, the second carrier is connected to the base through an axial elastomer extending in the first direction, and the prism module and the lens module are disposed in the base and sequentially arranged in the first direction; and
 an imaging module;
 wherein the second carrier comprises two side walls opposite to each other, an end wall connected to end portions of the side walls, and a bottom plate connected between bottom portions of the side walls; the lens module further comprises a planar elastomer configured to provide a restoring force for return of the first carrier and the second carrier when the first carrier and the second carrier are moved away from each other in the first direction; the planar elastomer is connected between the first carrier and the second carrier; the planar elastomer is in a plane defined by the first direction and a third direction; and the third direction is perpendicular to the first direction.

2. The imaging device as claimed in claim 1, wherein the base comprises two lateral walls extending in a second direction, a base wall connected to the lateral walls, and two lateral plates connected to the lateral walls and disposed opposite to each other;
 the base wall is perpendicular to the lateral walls; and the first direction is perpendicular to the second direction.

3. The imaging device as claimed in claim 2, further comprising:
 a first directional driving element disposed between the first carrier and the second carrier, and configured to drive the first carrier to move with respect to the second carrier in the first direction;
 a second directional driving element disposed between the side walls of the second carrier and the lateral plates of the base, and configured to drive the second carrier to move with respect to the base in the second direction; and
 a third directional driving element disposed between top portions of the side walls of the second carrier and the lateral plates of the base, and configured to drive the second carrier to move with respect to the base in the third direction; wherein the third direction is perpendicular to the first direction and the second direction.

4. The imaging device as claimed in claim 2, wherein a connecting element is disposed on an end portion of a side wall of the second carrier, the end portion of the side wall of the second carrier is adjacent to the prism module, and the axial elastomer has an end fixed to one of the lateral walls of the base and adjacent to the imaging module, and another end fixed to the connecting element.

5. The imaging device as claimed in claim 1, wherein the first carrier comprises two peripheral walls and an end wall connected to end portions of the peripheral walls, each peripheral wall is substantially U-shaped in section and has an opening; the end wall of the first carrier is close to the imaging module and is perpendicular to the first direction;
wherein the first carrier has first planar-elastomer connecting portions oppositely formed on the top surfaces of the peripheral walls; the second carrier has second planar-elastomer connecting portions oppositely disposed on top surfaces of the side walls;
wherein the planar elastomer comprises a first carrier connecting portion, a second carrier connecting portion, and a meandering portion connected between the first carrier connecting portion and the second carrier connecting portion, the first carrier connecting portion is connected to the first planar-elastomer connecting portions of the first carrier, the second carrier connecting portion is connected to the second planar-elastomer connecting portions of the second carrier.

6. The imaging device as claimed in claim 1, wherein the planar elastomer is connected between tops of the first and second carriers; the planar elastomer is parallel to the plane defined by the first direction and the third direction; and the third direction is perpendicular to the first direction.

7. The imaging device as claimed in claim 6, wherein the planar elastomer comprises a first carrier connecting portion, a second carrier connecting portion, and a meandering portion connected between the first carrier connecting portion and the second carrier connecting portion, and the meandering portion meanders to extend in the first direction and the third direction.

8. The imaging device as claimed in claim 7, wherein the second carrier connecting portion of the planar elastomer comprises a first part connected to the second carrier, and a second part extending from the first part and beyond the second carrier; the second part is in another plane perpendicular to the first direction; and the axial elastomer has an end connected to the base, and another end connected to the second part.

9. The imaging device as claimed in claim 8, wherein the second carrier further comprises a connecting portion connected between the side walls.

10. The imaging device as claimed in claim 9, wherein the connecting portion comprises a horizontal section and two inclined sections, and the inclined sections are slanted to extend from the side walls to the horizontal section; and the connecting portion is connected to either top portions of the side walls or bottom portions of the side walls.

11. The imaging device as claimed in claim 9, wherein the second carrier further comprises two connecting portions connected to top portions and bottom portions of the side walls respectively; and each of the connecting portions comprises a horizontal section and two inclined sections, and the inclined sections are slanted to extend from the side walls to the horizontal section.

12. An imaging device comprising:
a base;
a prism module fixedly disposed in the base;
a lens module comprising a lens unit, a first carrier configured to fix the lens unit, and a second carrier configured to accommodate the first carrier, wherein the lens unit has an optical axis extending in a first direction, the second carrier is connected to the base through an axial elastomer extending in the first direction, and the prism module and the lens module are disposed in the base and sequentially arranged in the first direction; and
an imaging module;
wherein the first carrier and the second carrier are connected through an inter-carrier axial elastomer extending in the first direction; the second carrier comprises two side walls opposite to each other, an end wall connected to end portions of the side walls, and a bottom plate connected between bottom portions of the side walls; a plurality of connecting elements are disposed on the end wall and end surfaces of the side walls; the inter-carrier axial elastomer comprises a first end fixed to the end wall of the second carrier, and a second end fixed to one of the connecting elements disposed on the end surfaces of the side walls of the second carrier; and the inter-carrier axial elastomer extending in the first direction is penetrated through the first carrier.

13. The imaging device as claimed in claim 12, wherein the base comprises two lateral walls extending in a second direction, a base wall connected to the lateral walls, and two lateral plates connected to the lateral walls and disposed opposite to each other; the base wall is perpendicular to the lateral walls; and the first direction is perpendicular to the second direction.

14. The imaging device as claimed in claim 13, further comprising:
a first directional driving element disposed between the first carrier and the second carrier, and configured to drive the first carrier to move with respect to the second carrier in the first direction;
a second directional driving element disposed between the side walls of the second carrier and the lateral plates of the base, and configured to drive the second carrier to move with respect to the base in the second direction; and
a third directional driving element disposed between top portions of the side walls of the second carrier and the lateral plates of the base, and configured to drive the second carrier to move with respect to the base in a third direction; wherein the third direction is perpendicular to the first direction and the second direction.

15. The imaging device as claimed in claim 14, wherein the inter-carrier axial elastomer provides the first carrier with a restoring force arising from deformation of the inter-carrier axial elastomer when the first carrier is moved with respect to the second carrier;
wherein the first carrier comprises two peripheral walls and an end wall connected to end portions of the peripheral walls, each peripheral wall is substantially U-shaped in section and has an opening; the end wall of the first carrier is close to the imaging module and is perpendicular to the first direction.

16. The imaging device as claimed in claim 13, wherein the connecting elements are disposed on one of the end portions of the side walls of the second carrier and fixed to an end of the axial elastomer, the one of the end portions of the side walls of the second carrier is adjacent to the prism module, and another end of the axial elastomer is fixed to one of the lateral walls of the base and adjacent to the imaging module.

17. The imaging device as claimed in claim 12, further comprising a first directional driving element, a second directional driving element and a third directional driving element;

wherein the base comprises two lateral walls extending in a second direction, a base wall connected to the lateral walls, and two lateral plates connected to the lateral walls and disposed opposite to each other; and the base wall is perpendicular to the lateral walls;

wherein the first directional driving element is disposed between the first carrier and the second carrier, and configured to drive the first carrier to move with respect to the second carrier in the first direction;

wherein the second directional driving element is disposed between the side walls of the second carrier and the lateral plates of the base, and configured to drive the second carrier to move with respect to the base in the second direction; and the first direction is perpendicular to the second direction;

wherein the third directional driving element is disposed between top portions of the side walls of the second carrier and the lateral plates of the base, and configured to drive the second carrier to move with respect to the base in a third direction; and the third direction is perpendicular to the first direction and the second direction; and wherein one of the connecting elements comprises a first part, a second part extending from the first part and connected to the inter-carrier axial elastomer, and a third part extending from the first part and connected to the axial elastomer; the second part and the third part are curved; the second part is in a plane perpendicular to the first direction and extends towards the first carrier; and the third part is in another plane perpendicular to the first direction and extends towards the base.

18. An imaging device comprising:

a base;

a prism module fixedly disposed in the base;

a lens module comprising a lens unit, a first carrier configured to fix the lens unit, and a second carrier configured to accommodate the first carrier, wherein the lens unit has an optical axis extending in a first direction, the second carrier is connected to the base through an axial elastomer extending in the first direction, and the prism module and the lens module are disposed in the base and sequentially arranged in the first direction;

an imaging module;

a first directional driving element, a second directional driving element and a third directional driving element;

wherein the second carrier comprises two side walls opposite to each other, an end wall connected to end portions of the side walls, and a bottom plate connected between bottom portions of the side walls;

wherein the base comprises two lateral walls extending in a second direction, a base wall connected to the lateral walls, and two lateral plates connected to the lateral walls and disposed opposite to each other; and the base wall is perpendicular to the lateral walls;

wherein the first directional driving element is disposed between the first carrier and the second carrier, and configured to drive the first carrier to move with respect to the second carrier in the first direction;

wherein the second directional driving element is disposed between the side walls of the second carrier and the lateral plates of the base, and configured to drive the second carrier to move with respect to the base in the second direction; and the first direction is perpendicular to the second direction;

wherein the third directional driving element is disposed between top portions of the side walls of the second carrier and the lateral plates of the base, and configured to drive the second carrier to move with respect to the base in a third direction; and the third direction is perpendicular to the first direction and the second direction; and wherein a first guide groove and a second guide groove extend in the first direction and are respectively formed on an outer surface of the first carrier and an inner surface of the second carrier, a ball is disposed in the first guide groove and second guide groove.

19. The imaging device as claimed in claim 18, the ball has a part disposed in the first guide groove and another part disposed in the second guide groove, the first carrier and the second carrier are connected through the ball, thereby allowing the first carrier to move with respect to the second carrier.

* * * * *